United States Patent
Bilgin et al.

(10) Patent No.: US 10,615,676 B2
(45) Date of Patent: Apr. 7, 2020

(54) SWITCHED RELUCTANCE MACHINE WITH EVEN POLE-PHASE INDEX

(71) Applicant: Enedym Inc., Hamilton (CA)

(72) Inventors: Berker Bilgin, Hamilton (CA); Ali Emadi, Burlington (CA)

(73) Assignee: Enedym Inc., Hamilton (CA)

( * ) Notice: Subject to any disclaimer, the term of this patent is extended or adjusted under 35 U.S.C. 154(b) by 111 days.

(21) Appl. No.: 15/574,180

(22) PCT Filed: May 13, 2016

(86) PCT No.: PCT/CA2016/050548
§ 371 (c)(1),
(2) Date: Nov. 15, 2017

(87) PCT Pub. No.: WO2016/183671
PCT Pub. Date: Nov. 24, 2016

(65) Prior Publication Data
US 2018/0138792 A1 May 17, 2018

Related U.S. Application Data

(60) Provisional application No. 62/161,905, filed on May 15, 2015.

(51) Int. Cl.
  *H02K 19/10* (2006.01)
  *H02K 1/24* (2006.01)
  *H02P 25/08* (2016.01)

(52) U.S. Cl.
  CPC .............. *H02K 19/103* (2013.01); *H02K 1/24* (2013.01); *H02P 25/08* (2013.01); *H02K 2213/03* (2013.01)

(58) Field of Classification Search
  CPC ...... H02K 19/03; H02K 1/24; H02K 2213/03; H02K 19/103; H02P 13/03

(Continued)

(56) References Cited

U.S. PATENT DOCUMENTS 4,748,362 A * 5/1988 Hedlund ............... H02K 1/246
310/162
6,781,273 B2   8/2004 Jinupun

FOREIGN PATENT DOCUMENTS

DE   10008239 A1   8/2000
GB    2366456 A    3/2002

OTHER PUBLICATIONS

Desai et al.: "Novel Switched Reluctance Machine Configuration With Higher Number of Rotor Poles Than Stator Poles: Concept to Implementation", IEEE Transactions on Industrial Electronics, vol. 57, No. 2, p. 649-659, Feb. 2010.

(Continued)

*Primary Examiner* — Michael Andrews
(74) *Attorney, Agent, or Firm* — Bereskin & Parr LLP/S.E.N.C.R.L., s.r.l.

(57) ABSTRACT

Various embodiments are described herein for switched reluctance machine configurations. In at least one embodiment, a switched reluctance machine configured according to the teachings herein comprises a stator including a predetermined number of salient stator poles ($N_s$), a rotor rotatably mounted with respect to the stator, with the rotor comprising a plurality of salient rotor poles, and a plurality of coils provided around the predetermined number of stator poles to form at least one phase of the switched reluctance machine, where the rotor poles and the stator poles are symmetrically disposed, and a number of rotor poles is related to 0☐ and a number of phases according to: i) $(N_s/m)k$ ceil $(\mathrm{mod}(k,m)/m)$ number of phases, and ii) $(N_s/m)k$ ceil $(\mathrm{mod}(k,m/2)/m/2)$ for an even number of phases, where m is the number of phases, and k is a configuration index based on $N_s$ and m.

20 Claims, 10 Drawing Sheets

(58) Field of Classification Search
USPC ....................................................... 310/40 R
See application file for complete search history.

(56) References Cited

OTHER PUBLICATIONS

T.J.E. Miller: "Optimal Designs of Switched Reluctance Motors", IEEE Transactions on Industrial Electronics, vol. 49, No. 1, p. 15-27, Feb. 2002.
European Search Report of corresponding European Patent Application No. 16795585.5 dated Jan. 14, 2019, pp. 1-9.
International Search Report and Written Opinion of corresponding International Application No. PCT/CA2016/050548 dated Aug. 12, 2016.

* cited by examiner

SWITCHED RELUCTANCE MACHINE WITH EVEN POLE-PHASE INDEX

CROSS-REFERENCE TO RELATED APPLICATION

This application claims the benefit of United States Provisional Patent Application No. 62/161,905 filed May 15, 2015, the contents of which are incorporated herein by reference.

TECHNICAL FIELD

The described embodiments relate generally to a switched reluctance machine, and in particular, to a switched reluctance machine and method for manufacturing a switched reluctance machine having an even number of stator poles per phase.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically have concentrated windings around each stator pole to generate electromagnetic field. Typically, in a switched reluctance machine, depending on the number of poles in each phase, the windings around the stator poles are connected in series or parallel to create phase windings. When a phase is energized, the flux generated by the coil windings closes its path through the rotor and the closest rotor pole rotates to get in alignment with the stator pole. Due to double saliency, i.e. salient poles around both the stator and the rotor, when the rotor pole moves towards the stator pole, the airgap length, and, hence, the stored energy changes.

However, conventional switched reluctance machines often suffer from high torque ripple, low torque density, vibration and acoustic noise.

SUMMARY

In one aspect, at least one embodiment described herein provides a switched reluctance machine comprising at least one stator including a predetermined number of stator poles, wherein each stator pole is a salient pole; at least one rotor rotatably mounted with respect to the at least one stator, the at least one rotor comprising a plurality of rotor poles, wherein the plurality of rotor poles are salient poles; and a plurality of coils provided around the predetermined number of stator poles to form at least one phase of the switched reluctance machine, the plurality of coils adapted to carry electric current to generate magnetic flux, wherein the plurality of rotor poles and the predetermined number of stator poles are symmetrically disposed, and wherein a number of rotor poles is related to the predetermined number of stator poles and a number of phases according to:

$$\left(\frac{N_s}{m}\right)k \; \text{ceil}\left(\frac{\text{mod}(k, m)}{m}\right),$$

if the number of phases is an odd number, and $$\left(\frac{N_s}{m}\right)k \; \text{ceil}\left(\frac{\text{mod}\left(k, \frac{m}{2}\right)}{\frac{m}{2}}\right),$$

if the number of phases is an even number, wherein $N_s$ is the predetermined number of stator poles, m is the number of phases, and k is a configuration index based on the predetermined number of stator poles and the number of phases.

In one aspect, at least one embodiment described herein provides a method for manufacturing a switched reluctance machine having a plurality of rotor poles and a number of stator poles, the method including determining a number of phases; determining a number of the rotor poles, the number of stator poles and the number of phases according to $$\left(\frac{N_s}{m}\right)k \; \text{ceil}\left(\frac{\text{mod}(k, m)}{m}\right),$$

if the number of phases is an odd number, and $$\left(\frac{N_s}{m}\right)k \text{ceil}\left(\frac{\text{mod}\left(k, \frac{m}{2}\right)}{\frac{m}{2}}\right),$$

if the number of phases is an even number, wherein $N_s$ is the predetermined number of stator poles, m is the number of phases, and k is a configuration index based on the predetermined number of stator poles and the number of phases; providing a stator having the predetermined number of stator poles, wherein each stator pole is a salient stator pole and the predetermined number of stator poles are symmetrically disposed; rotatably mounting a rotor with respect to the stator, the rotor having the plurality of rotor poles corresponding to the number of rotor poles, wherein the plurality of rotor poles are salient poles and the plurality of rotor poles are symmetrically disposed; and winding a plurality of coils around the predetermined number of stator poles to form at least one phase of the switched reluctance machine, the plurality of coils adapted to carry electric current to generate magnetic flux, the at least one phase comprising the number of phases.

In various embodiments of a switched reluctance machine and/or a method for manufacturing a switched reluctance machine, a pole-phase index of the switched reluctance machine is an even number, where the pole-phase index is a ratio of the predetermined number of stator poles to the number of phases.

In various embodiments of a switched reluctance machine and/or a method for manufacturing a switched reluctance machine, if the number of phases is 3 and the pole-phase index is 2, the configuration index is determined according to:

$$k = \left\{\frac{m+1}{2}+4, \frac{m+1}{2}+5, \frac{m+1}{2}+6, \ldots\right\} - \left(\frac{m+1}{2}+8\right).$$

In various embodiments of a switched reluctance machine and/or a method for manufacturing a switched reluctance machine, if the number of phases is 3 and the pole-phase index is 4, the configuration index is determined according to:

$$k = \left\{ \frac{m+1}{2} + 3, \frac{m+1}{2} + 4, \frac{m+1}{2} + 5, \ldots \right\}.$$

In various embodiments of a switched reluctance machine and/or a method for manufacturing a switched reluctance machine, if the number of phases is 3 and the pole-phase index is equal to or greater than 6, the configuration index is determined according to:

$$k = \left\{ \frac{m+1}{2} + 1, \frac{m+1}{2} + 2, \frac{m+1}{2} + 3, \ldots \right\}.$$

In various embodiments of a switched reluctance machine and/or a method for manufacturing a switched reluctance machine, if the number of phases is 4 and the pole-phase index is 2, the configuration index is determined according to:

$$k = \left\{ \frac{m+2}{2} + 5, \frac{m+2}{2} + 6, \frac{m+2}{2} + 7, \ldots \right\}.$$

In various embodiments of a switched reluctance machine and/or a method for manufacturing a switched reluctance machine, if the number of phases is 4 and the pole-phase index is 4, the configuration index is determined according to:

$$k = \left\{ \frac{m+2}{2} + 3, \frac{m+2}{2} + 4, \frac{m+2}{2} + 5, \ldots \right\}.$$

In various embodiments of a switched reluctance machine and/or a method for manufacturing a switched reluctance machine, if the number of phases is 4 and the pole-phase index is equal to or greater than 6, the configuration index is determined according to:

$$k = \left\{ \frac{m+2}{2} + 1, \frac{m+2}{2} + 2, \frac{m+2}{2} + 3, \ldots \right\}.$$

In various embodiments of a switched reluctance machine and/or a method for manufacturing a switched reluctance machine, if the number of phases is 5 and the pole-phase index is 2, the configuration index is determined according to:

$$k = \left\{ \frac{m+1}{2} + 4, \frac{m+1}{2} + 5, \ldots \right\} - \left( \frac{m+1}{2} + 6 \right).$$

In various embodiments of a switched reluctance machine and/or a method for manufacturing a switched reluctance machine, if the number of phases is 5 and the pole-phase index is 4, the configuration index is determined according to:

$$k = \left\{ \frac{m+1}{2} + 2, \frac{m+1}{2} + 3, \frac{m+1}{2} + 4, \ldots \right\}.$$

In various embodiments of a switched reluctance machine and/or a method for manufacturing a switched reluctance machine, if the number of phases is 5 and the pole-phase index is equal to or greater than 6, the configuration index is determined according to:

$$k = \left\{ \frac{m+1}{2}, \frac{m+1}{2} + 1, \frac{m+1}{2} + 2, \ldots \right\}.$$

In various embodiments of a switched reluctance machine and/or a method for manufacturing a switched reluctance machine, if the number of phases is 6 and the pole-phase index is 2, the configuration index is determined according to:

$$k = \left\{ \frac{m+2}{2} + 2, \frac{m+2}{2} + 3, \ldots \right\} - \left\{ \left( \frac{m+2}{2} + 4 \right), \left( \frac{m+2}{2} + 7 \right) \right\}.$$

In various embodiments of a switched reluctance machine and/or a method for manufacturing a switched reluctance machine, if the number of phases is 6 and the pole-phase index is 4, the configuration index is determined according to:

$$k = \left\{ \frac{m+2}{2} + 2, \frac{m+2}{2} + 3, \frac{m+2}{2} + 4, \ldots \right\}.$$

In various embodiments of a switched reluctance machine and/or a method for manufacturing a switched reluctance machine, if the number of phases is 6 and the pole-phase index is equal to or greater than 6, the configuration index is determined according to:

$$k = \left\{ \frac{m+2}{2}, \frac{m+2}{2} + 1, \frac{m+2}{2} + 2, \ldots \right\}.$$

In various embodiments of a switched reluctance machine and/or a method for manufacturing a switched reluctance machine, if the number of phases is 7 and the pole-phase index is 2, the configuration index is determined according to:

$$k = \left\{ \frac{m+1}{2} + 5, \frac{m+1}{2} + 6, \frac{m+1}{2} + 7, \ldots \right\} - (N_s - 1).$$

In various embodiments of a switched reluctance machine and/or a method for manufacturing a switched reluctance machine, if the number of phases is 7 and the pole-phase index is equal to or greater than 4, the configuration index is determined according to:

$$k = \left\{ \frac{m+1}{2}, \frac{m+1}{2} + 1, \frac{m+1}{2} + 2, \ldots \right\}.$$

In various embodiments of a switched reluctance machine and/or a method for manufacturing a switched reluctance machine, if the number of phases is 8 and the pole-phase index is 2, the configuration index is determined according to:

$$k = \left\{ \frac{m+2}{2} + 2, \frac{m+2}{2} + 3, \frac{m+2}{2} + 4, \ldots \right\} - (N_s - 1).$$

In various embodiments of a switched reluctance machine and/or a method for manufacturing a switched reluctance machine, if the number of phases is 8 and the pole-phase index is equal to or greater than 4, the configuration index is determined according to:

$$k = \left\{ \frac{m+2}{2}, \frac{m+2}{2} + 1, \frac{m+2}{2} + 2, \ldots \right\}.$$

In various embodiments of a switched reluctance machine and/or a method for manufacturing a switched reluctance machine, if the number of phases is 9 and the pole-phase index is 2, the configuration index is determined according to:

$$k = \left\{ \frac{m+1}{2} + 3, \frac{m+1}{2} + 4, \frac{m+1}{2} + 5 \ldots \right\} - (N_s - 1).$$

In various embodiments of a switched reluctance machine and/or a method for manufacturing a switched reluctance machine, if the number of phases is 9 and the pole-phase index is equal to or greater than 4, the configuration index is determined according to:

$$k = \left\{ \frac{m+1}{2}, \frac{m+1}{2} + 1, \frac{m+1}{2} + 2, \ldots \right\}.$$

In various embodiments of a switched reluctance machine and/or a method for manufacturing a switched reluctance machine, if the number of phases is equal to or greater than 10, the configuration index is determined according to:

$$k = \left\{ \frac{m+2}{2}, \frac{m+2}{2} + 1, \frac{m+2}{2} + 2, \ldots \right\} - (N_s - 1),$$

if the number of phases is an even number, and $$k = \left\{ \frac{m+1}{2}, \frac{m+1}{2} + 1, \frac{m+1}{2} + 2, \ldots \right\} - (N_s - 1),$$

if the number of phases is an odd number.

In various embodiments of a switched reluctance machine and/or a method for manufacturing a switched reluctance machine, the predetermined number of stator poles and the plurality of rotor poles are manufactured using soft magnetic materials.

In various embodiments of a switched reluctance machine and/or a method for manufacturing a switched reluctance machine, the predetermined number of stator poles and the plurality of rotor poles are disposed in a configuration selected from the group consisting of an interior rotor configuration, an exterior rotor configuration, an axial flux configuration, a linear configuration, a multiple-rotor configuration and a multiple-stator configuration.

In various embodiments of a switched reluctance machine and/or a method for manufacturing a switched reluctance machine, the predetermined number of stator poles is selected to be an even number and the predetermined number of stator poles are equidistant from each other to provide a symmetrical disposition.

In various embodiments of a switched reluctance machine and/or a method for manufacturing a switched reluctance machine, the rotor poles are equidistant from each other to provide a symmetrical disposition.

In various embodiments of a switched reluctance machine and/or a method for manufacturing a switched reluctance machine, each stator pole of the predetermined number of stator poles has an electrical position determined according to:

$$N_{s\_elect} = \mathrm{mod}((N_{s\_mech} - N_{r\_mech})N_r + 180°, 360)$$

where $N_{s\_elect}$ is the electrical position of a stator pole, $N_{s\_mech}$ is a mechanical position of the stator pole, and $N_{r\_mech}$ is a mechanical position of a rotor pole, where the mechanical position of each stator pole is determined according to $\theta_s[p] = T_{ps}(p-1)$, where $$T_{ps} = \frac{360}{N_s},$$

and $p = 1, 2, \ldots, N_s$, wherein $\theta_s[p]$ is the mechanical position of each stator pole, and
where the mechanical position of each rotor pole is determined according to $\theta_r[t] = T_{pr}(t-1)$, where $$T_{pr} = \frac{360}{N_r},$$

and $t = 1, 2, \ldots, N_r$, wherein $\theta_r[t]$ is the mechanical position of each rotor pole.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figures 1A, 1B:
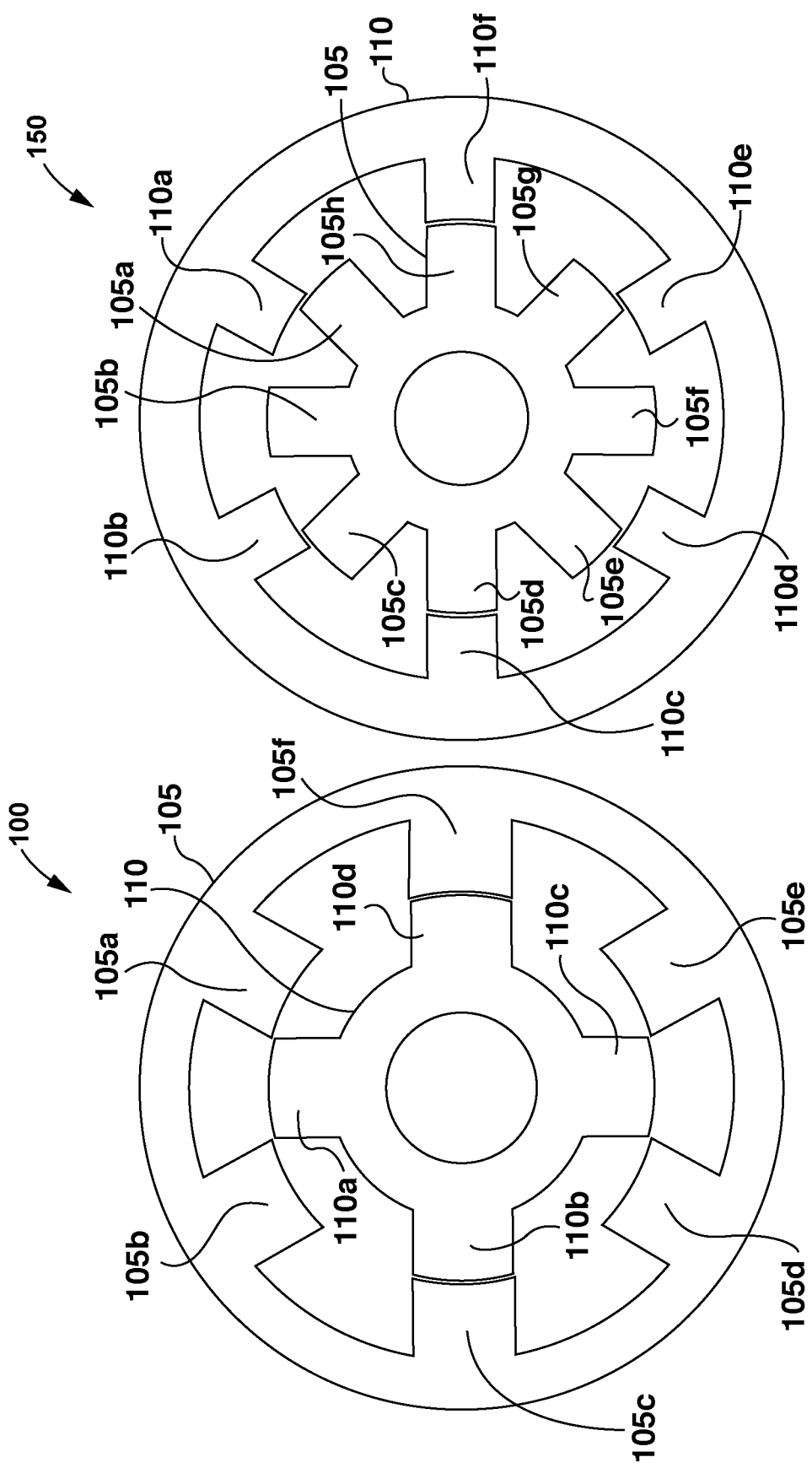
FIG. 1A illustrates a conventional 6/4 switched reluctance machine according to an example embodiment.
FIG. 1B illustrates a conventional 8/6 switched reluctance machine according to an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical, electrical or magnetic connotation. For example, as used herein, the terms "coupled" or "coupling" can indicate that two elements or devices can be directly connected to one another or connected to one another through one or more intermediate elements or devices via an electrical element, electrical signal, a mechanical element or magnetic flux such as but not limited to, a wire, a cable, or magnetic field, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

Reference is first made to FIGS. 1A, 1B, 2, 3 and 4 illustrating cross-sectional views of conventional switched reluctance machines ("SRMs"). FIG. 1A illustrates a cross-sectional view of a conventional 6/4 SRM 100 according to an example embodiment. The 6/4 SRM 100 has a stator 105 and a rotor 110 located inside the stator 105. Stator 105 comprises six stator poles and rotor 110 comprises four rotor poles. As illustrated, the 6/4 SRM 100 includes a first stator pole 105a, a second stator pole 105b, a third stator pole 105c, a fourth stator pole 105d, a fifth stator pole 105e, and a sixth stator pole 105f. The conventional 6/4 SRM 100 also includes a first rotor pole 110a, a second rotor pole 110b, a third rotor pole 110c and a fourth rotor pole 110d.

Reference is next made to FIG. 1B, which illustrates a cross-sectional view of a conventional 8/6 SRM 150 according to an example embodiment. The 8/6 SRM 150 has a rotor 110 and a stator 105 located inside the rotor 110. Stator 105 comprises eight stator poles and rotor 110 comprises six rotor poles. As illustrated, the 8/6 SRM 100 includes a first stator pole 105a, a second stator pole 105b, a third stator pole 105c, a fourth stator pole 105d, a fifth stator pole 105e, a sixth stator pole 105f, a seventh stator pole 105g and an eighth stator pole 105h. The conventional 8/6 SRM 100 also includes a first rotor pole 110a, a second rotor pole 110b, a third rotor pole 110c, a fourth rotor pole 110d, a fifth rotor pole 110e and a sixth rotor pole 110f.

Figure 2:
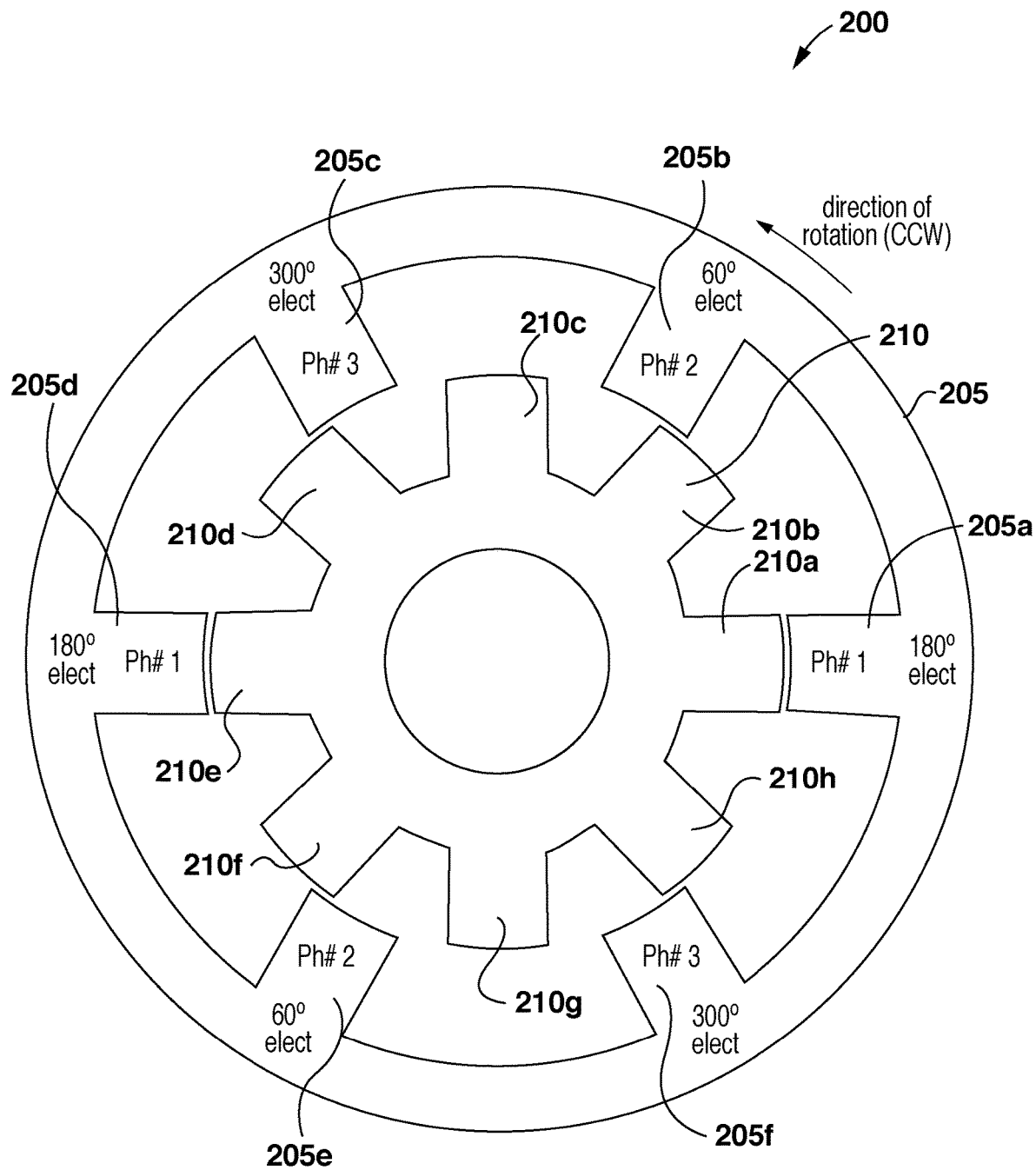
FIG. 2 illustrates a three-phase 6/8 switched reluctance machine according to an example embodiment.

Reference is next made to FIG. 2, which illustrates a cross-sectional view of a conventional three-phase 6/8 SRM 200 according to an example embodiment. The SRM 200 has a stator 205 and a rotor 210 located inside the stator 205. Stator 205 comprises six stator poles and rotor 210 comprises eight rotor poles. As illustrated, the 6/8 SRM 200 includes a first stator pole 205a, a second stator pole 205b, a third stator pole 205c, a fourth stator pole 205d, a fifth stator pole 205e and a sixth stator pole 205f. The 6/8 SRM 200 also includes a first rotor pole 210a, a second rotor pole 210b, a third rotor pole 210c, a fourth rotor pole 210d, a fifth rotor pole 210e, a sixth rotor pole 210f, a seventh rotor pole 210g and an eighth rotor pole 210h.

Figure 3:
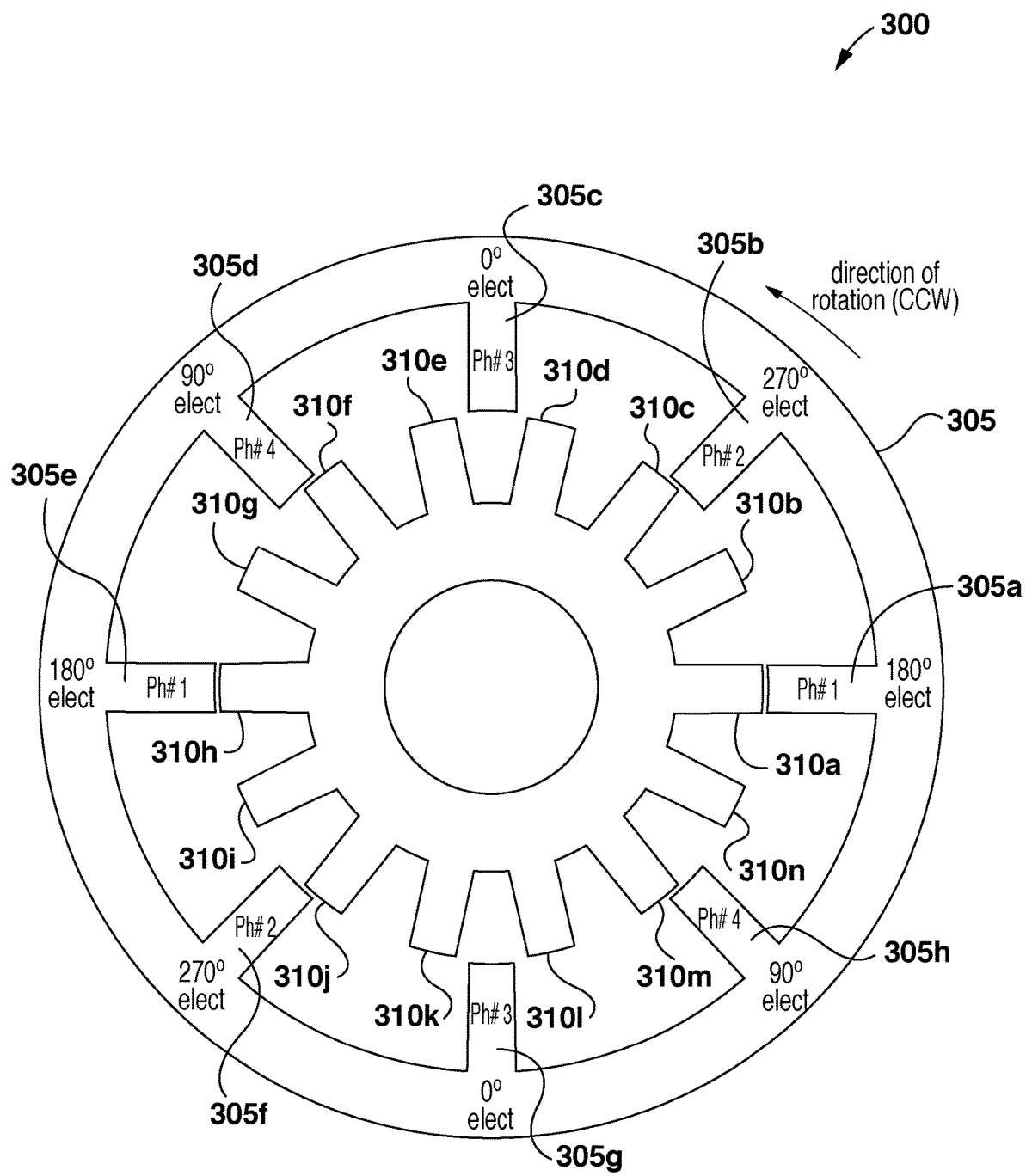
FIG. 3 illustrates a four-phase 8/14 switched reluctance machine according to an example embodiment.

Next, reference is made to FIG. 3, which illustrates a cross-sectional view of a four-phase 8/14 SRM 300 according to an example embodiment. The SRM 300 has a stator 305 and a rotor 310 located inside the stator 305. Stator 305 comprises eight stator poles and rotor 310 comprises fourteen rotor poles. As illustrated, the 8/14 SRM 300 includes a first stator pole 305a, a second stator pole 305b, a third stator pole 305c, a fourth stator pole 305d, a fifth stator pole 305e, a sixth stator pole 305f, a seventh stator pole 305g and an eighth stator pole 305h. The 8/14 SRM 300 also includes a first rotor pole 310a, a second rotor pole 310b, a third rotor pole 310c, a fourth rotor pole 310d, a fifth rotor pole 310e, a sixth rotor pole 310f, a seventh rotor pole 310g, an eighth rotor pole 310h, a ninth rotor pole 310i, a tenth rotor pole 310j, an eleventh rotor pole 310k, a twelfth rotor pole 310l, a thirteenth rotor pole 310m and a fourteenth rotor pole 310n.

Figure 4:
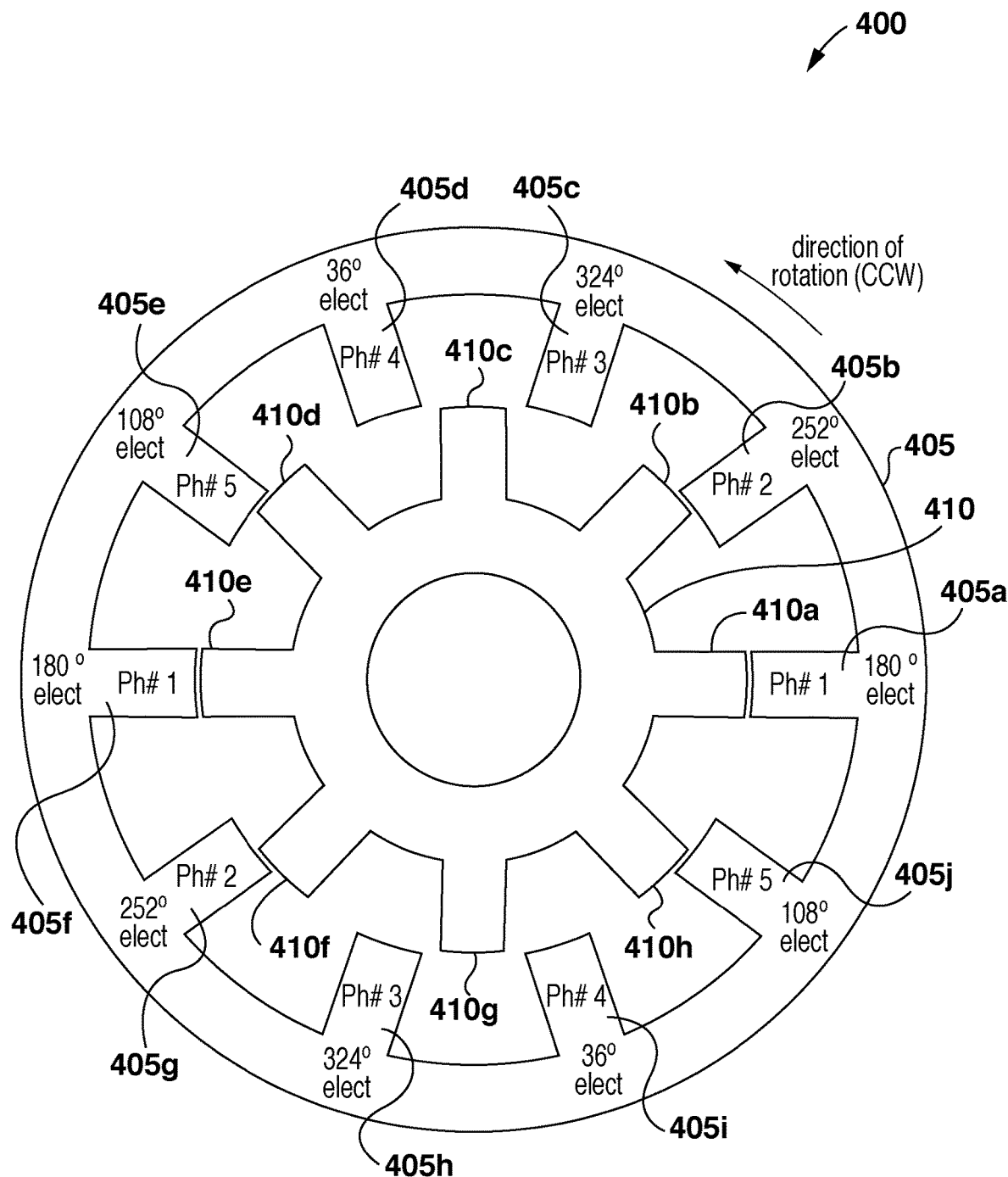
FIG. 4 illustrates a five-phase 10/8 switched reluctance machine according to an example embodiment.

FIG. 4 illustrates a cross-sectional view of a five-phase 10/8 SRM 400 according to an example embodiment. The SRM 400 has a stator 405 and a rotor 410 located inside the stator 405. Stator 405 comprises ten stator poles and rotor 410 comprises eight rotor poles. Accordingly, the 10/8 SRM 400 includes a first stator pole 405a, a second stator pole 405b, a third stator pole 405c, a fourth stator pole 405d, a fifth stator pole 405e, a sixth stator pole 405f, a seventh stator pole 405g, an eighth stator pole 405h, a ninth stator pole 405i and a tenth stator pole 405j. The 10/8 SRM 400 also includes a first rotor pole 410a, a second rotor pole 410b, a third rotor pole 410c, a fourth rotor pole 410d, a fifth rotor pole 410e, a sixth rotor pole 410f, a seventh rotor pole 410g, and an eighth rotor pole 410h.

Conventional SRMs, such as those illustrated in FIGS. 1A, 1B, 2, 3 and 4 often suffer from various disadvantages, including high torque ripple, low torque density, vibration and acoustic noise, etc. Furthermore, attempts to overcome these disadvantages by reconfiguring the SRMs, such as by increasing the number of stator and rotor poles, increasing the number of phases etc., often requires constant iterations and experimentations to determine a workable configuration of the SRM.

The various embodiments disclosed herein relate to a family of SRMs having an even pole-phase index, or in other words, switched reluctance machines having an even number of stator poles per phase. In the various embodiments disclosed herein, for a given number of phases, pole-phase index and configuration index, discussed in detail below, the SRMs disclosed herein are configured to have a different combination of number of stator poles and number of rotor poles as compared to conventional topologies.

In the various embodiments illustrated herein, the rotors and stators of the SRMs are manufactured using soft magnetic materials, examples of which may include laminated electrical steel, soft magnetic composites etc. The teachings of the various embodiments illustrated herein can be applied to any type of SRM configuration. For example, the various embodiments illustrated herein can be applied to a SRM with an interior rotor configuration where the rotor is disposed inside the stator or an exterior rotor configuration where the stator is disposed inside the rotor.

The various embodiments illustrated herein can also be applied to a SRM with an axial flux configuration. An axial flux SRM typically utilizes one or more rotor discs spaced along a rotor shaft, where each rotor disc has a plurality of rotor poles spaced along the periphery of the rotor disc. In the axial flux SRM, stator elements are distributed circumferentially about the rotor discs and form pairs of radially extending stator poles for axially straddling the rotor discs.

The various embodiments illustrated herein can also be applied to a SRM with a linear configuration. A linear SRM is typically a linear version of a rotary SRM and comprises the stator and the rotor unrolled into a plane. Similarly, the various embodiments illustrated herein can also be applied to a SRM with a multiple-rotor configuration where a stator and multiple rotors are disposed concentrically, or a multiple-stator configuration where a rotor and multiple stators are disposed concentrically. The various embodiments illustrated herein can also be applied to other types of SRM configurations.

In various embodiments illustrated herein, the stators of the SRMs have coils wound around each stator pole. In some such embodiments, the rotors do not have any kind of excitation source, such as coils, permanent magnets etc. In some other such embodiments, the rotors also comprise some kind of excitation source, such as, permanent magnets for example.

Depending on criteria such as configuration and performance requirements of the SRMs, the coils may be connected to the stator in series, parallel or in a combination of series/parallel circuits to create an electrical phase. When current is applied to a phase, the magnetic flux magnetizes the rotor pole and attracts it towards the stator pole, thereby decreasing the airgap between the rotor and the stator poles. This reduces the reluctance in the magnetic path and creates an electromagnetic torque in the airgap.

The various SRMs disclosed herein have a symmetrical configuration for an electrical phase of three or higher. In other words, the SRMs disclosed herein provide a symmetrical and evenly distributed stator and rotor pole construction.

In some embodiments, the SRMs disclosed herein have only one type of salient pole on the stator. In some additional embodiments, the SRMs disclosed herein have only one type of salient pole on the rotor. In various embodiments, the SRMs disclosed herein have a single-teeth-per pole type construction. In various other embodiments, the SRMs disclosed herein have concentrated windings wound around each stator pole.

The various embodiments of the SRMs disclosed herein may provide various advantages over conventional SRMs. Such advantages may include low manufacturing costs, low torque ripple, high torque density, low implementation costs, etc. For example, a three-phase 18/24 SRM according to the teachings herein may provide various advantages over a conventional four-phase 24/18 SRM. In both scenarios, the SRM provides 72 strokes in one mechanical revolution. In each configuration, each stator pole has concentrated coil wound around it. Therefore, the four-phase 24/18 SRM has more coils than the three-phase 18/24 SRM, and incurs more manufacturing costs. In addition, the four-phase 24/18 SRM requires four power electronic converter legs to control the current in each phase. This may result in additional inconvenience, such as additional costs.

In another example, a three-phase 6/14 SRM according to the teachings herein may provide various advantages over conventional SRMs, such as a three-phase 6/8 SRM and a three-phase 6/10 SRM. The conventional topologies, i.e. the three-phase 6/8 SRM and the three-phase 6/10 SRM, have 24 and 30 strokes in one mechanical revolution respectively. The three-phase 6/14 SRM has 42 strokes in one mechanical revolution, which may provide the benefits of lower torque ripple and higher torque density.

In another example, a three-phase 6/16 SRM according to the teachings herein may provide various advantages over a conventional three-phase 12/16 SRM. While both the three-phase 6/16 SRM and the three-phase 12/16 SRM configurations have 48 strokes in one revolution, the three-phase 6/16 SRM has half the number of coils as the conventional three-phase 12/16 SRM. This may result in a low implementation cost for the three-phase 6/16 SRM. In addition, for the same stator diameter, the three-phase 6/16 SRM may have a larger slot area as compared to a conventional three-phase 12/16 SRM, which may enable a coil design with smaller resistance or extra space to enhance the cooling of the SRM.

In the various SRM embodiments illustrated herein, the center of axis of each stator pole, such as each stator pole 205a-205f of FIG. 2, and each rotor pole, such as each rotor pole 210a-210h of FIG. 2, stands at a certain mechanical angle. Considering the symmetric and even distribution of stator and rotor poles, the mechanical angle, referred to herein as "pole pitch", is defined as equations (1) and (2) below.

$$T_{pr} = \frac{360}{N_r}, \theta_r[t] = T_{pr}(t-1), t = 1, 2, \ldots, N_r \quad (1)$$

$$T_{ps} = \frac{360}{N_s}, \theta_s[p] = T_{ps}(p-1), p = 1, 2, \ldots, N_s \quad (2)$$

where $T_{pr}$ and $T_{ps}$ are the pole pitch, $N_r$ and $N_s$ are the number of poles for the rotor and stator, and $\theta_r[t]$ and $\theta_s[p]$ are the mechanical angles for each rotor and stator pole, respectively.

As illustrated in FIG. 2, stator pole 205a has a mechanical angle of 0°, stator pole 205b has a mechanical angle of 60°, stator pole 205c has a mechanical angle of 120°, stator pole 205d has a mechanical angle of 180°, stator pole 205e has a mechanical angle of 240°, and stator pole 205f has a mechanical angle of 300°. Similarly, rotor pole 210a has a mechanical angle of 0°, rotor pole 210b has a mechanical angle of 45°, rotor pole 210c has a mechanical angle of 90°, rotor pole 210d has a mechanical angle of 135°, rotor pole 210e has a mechanical angle of 180°, rotor pole 210f has a mechanical angle of 225°, rotor pole 210g has a mechanical angle of 270°, and rotor pole 210h has a mechanical angle of 315°.

Similarly, in the embodiment of FIG. 3, each stator pole and each rotor pole stands at a mechanical angle. As illustrated, the stator pole 305a has a mechanical angle of 0°, stator pole 305b has a mechanical angle of 45°, stator pole 305c has a mechanical angle of 90°, stator pole 305d has a mechanical angle of 135°, stator pole 305e has a mechanical angle of 180°, stator pole 305f has a mechanical angle of 225°, 305g has a mechanical angle of 270°, and stator pole 305h has a mechanical angle of 315°.

Similarly, rotor pole 310a has a mechanical angle of 0°, rotor pole 310b has a mechanical angle of approximately 25.7°, rotor pole 310c has a mechanical angle of approximately 51.4°, rotor pole 310d has a mechanical angle of approximately 77.1°, rotor pole 310e has a mechanical angle of approximately 102.9°, rotor pole 310f has a mechanical angle of approximately 128.6°, rotor pole 310g has a mechanical angle of approximately 154.3°, rotor pole 310h has a mechanical angle of 180°, rotor pole 310i has a mechanical angle of approximately 205.7°, rotor pole 310j has a mechanical angle of approximately 231.4°, rotor pole 310k has a mechanical angle of approximately 257.1°, rotor pole 310l has a mechanical angle of approximately 282.9°, rotor pole 310m has a mechanical angle of approximately 308.6°, and rotor pole 310n has a mechanical angle of approximately 334.3°.

The mechanical positions are next illustrated with reference to FIG. 4. As illustrated in FIG. 4, the stator pole 405a has a mechanical angle of 0°, stator pole 405b has a mechanical angle of 36°, stator pole 405c has a mechanical angle of 72°, stator pole 405d has a mechanical angle of 108°, stator pole 405e has a mechanical angle of 144°, stator pole 405f has a mechanical angle of 180°, stator pole 405g has a mechanical angle of 216°, stator pole 405h has a mechanical angle of 252°, stator pole 405i has a mechanical angle of 288°, and stator pole 405j has a mechanical angle of 324°.

Similarly, rotor pole 410a has a mechanical angle of 0°, rotor pole 410b has a mechanical angle of 45°, rotor pole 410c has a mechanical angle of 90°, rotor pole 410d has a mechanical angle of 135°, rotor pole 410e has a mechanical angle of 180°, rotor pole 410f has a mechanical angle of 225°, rotor pole 410g has a mechanical angle of approximately 270°, and rotor pole 410h has a mechanical angle of 315°.

In the various embodiments of SRMs illustrated herein, the torque profiles of the SRMs depend on the relative position between the stator poles and the rotor poles. Depending on the number of rotor and stator poles, each stator pole has a certain electrical position. As illustrated in FIG. 2, each stator pole 205a-205f has an electrical position. Considering counter clockwise rotation, stator pole 205a has an electrical position of 180°, stator pole 205b has an electrical position of 60°, stator pole 205c has an electrical position of 300°, stator pole 205d has an electrical position of 180°, stator pole 205e has an electrical position of 60°, and stator pole 205f has an electrical position of 300°.

As previously mentioned, in the various embodiments illustrated herein, coils are wound around the stator poles. If the coils with the same electrical position are excited with the same current, the poles generate the same torque and the stator poles associated with those electrical positions make up a phase. In the illustrated embodiment of FIG. 2, stator pole pair 205a and 205d, stator pole pair 205b and 205e, and stator pole pair 205c and 205f share the same electrical position, and accordingly, make up a phase respectively.

In the various embodiments illustrated herein, an electrical cycle is defined when a rotor moves from a position, where a certain stator pole is in the middle of two consecutive rotor poles, to a next similar position. In the illustrated embodiment of FIG. 2, an electrical cycle is defined where rotor 210 moves from a position (where a certain stator pole, such as, for example, second stator pole 205b, is in the middle of two consecutive rotor poles, such as second rotor pole 210b and third rotor pole 210c) to a next similar position.

Depending on the number of rotor and stator poles, each stator pole has a certain electrical position at a given position of the rotor. This can be an aligned position, which corresponds to 180° electrical, an unaligned position, which corresponds to 0° electrical, somewhere before the alignment, which corresponds to <180° electrical, or somewhere after the alignment, which corresponds to >180° electrical.

As illustrated in FIG. 2, the rotor poles are at a certain electrical angle for a given mechanical position. For example, the first rotor pole 210a is aligned with the first stator pole 205a, which corresponds to 180° electrical. Similarly, the fifth rotor pole 210e is aligned with the fourth stator pole 205d, which corresponds to 180° electrical. The difference in the mechanical angle between these stator poles 205a, 205d and rotor poles 210a, 210e, respectively, is zero.

In one mechanical revolution, the relative mechanical position between a certain rotor pole and a certain stator pole repeats itself only once. However, considering the other rotor poles, the same relative position repeats itself as frequently as the number of rotor poles for a certain stator pole. In other words, in one mechanical revolution, the electrical angle varies as fast as the number of rotor poles than the mechanical angle. In the illustrated embodiment of FIG. 2, for the first stator pole 205a, when the rotor 210 rotates by the rotor pole pitch, i.e. 45° in counter clockwise direction, the eighth rotor pole 210h will be aligned with the first stator pole 205a, which is still 180° electrical for the first stator pole 205a. The electrical angle for the first stator pole 205a is calculated using equation (3).

$$N_s\#1_{elect}=(N_s\#1_{mech}-N_r\#1_{mech})N_r+180° \quad (3)$$

where $N_s\#1_{elect}$ is the electrical angle for the first stator pole 205a, $N_s\#1_{mech}$ and $N_r\#1_{mech}$ are the mechanical angles for the first stator pole 205a and the first rotor pole 210a, respectively. 180° is added because the first rotor pole 210a is aligned with the first stator pole 205a at the initial position.

Similar to mechanical position, electrical angle also has a 360° cycle. In embodiments illustrated herein, wherein the SRM configuration is symmetric and the pole pitch between each rotor pole is a constant, the electrical angle for the stator poles is calculated using equation (4). For a given stator pole, equation (4) will result in the same value for all the rotor poles at a given position.

$$N_{s\_elect}=\mathrm{mod}((N_{s\_mech}-N_{r\_mech})N_r+180°,360) \quad (4)$$

$N_{s\_elect}$ is the electrical position of a stator pole, $N_{s\_mech}$ is the mechanical position of the stator pole, and $N_{r\_mech}$ is the mechanical position of the rotor pole.

In the illustrated embodiment of FIG. 2, if the second stator pole 205b and fifth stator pole 205e are energized at the same time, the rotor 210 starts rotating counter clockwise. When the second rotor pole 210b and the sixth rotor pole 210f are aligned with the second stator pole 205b and the fifth stator pole 205e, the rotor rotates 15° mechanical. Then the third rotor pole 210c and the seventh rotor pole 210g are at 60° electrical with respect to the third stator pole 205c and the sixth stator pole 205f, respectively. By exciting the third stator pole 205c and the sixth stator pole 205f before the alignment of the second rotor pole 210b and the sixth rotor pole 210f with the second stator pole 205b and the fifth stator pole 205e, respectively, continuous torque production is maintained in counter clockwise direction.

Since the stator pole pairs, the first 205a and fourth 205d stator poles at 180° electrical, the second 205b and fifth 205e stator poles at 60° electrical, and the third 205c and sixth 205f stator poles at 300° electrical, always have the same electrical position relative to each other but different from other stator pole pairs, when the same current is applied at the same instant, these poles create the same torque on the opposite corners of a central bore of the SRM. This is accomplished by connecting the coils of these stator pole pairs in the same electrical circuit, which creates the phases. As illustrated, the SRM 200 is a three-phase machine.

The electrical positions are next illustrated with reference to FIGS. 3 and 4. In the embodiment of FIG. 3, the stator poles 305a-305h have corresponding electrical positions where stator pole 305a has an electrical position of 180°, stator pole 305b has an electrical position of 270°, stator pole 305c has an electrical position of 0°, stator pole 305d has an electrical position of 90°, stator pole 305e has an electrical position of 180°, stator pole 305f has an electrical position of 270°, stator pole 305g has an electrical position of 0°, and stator pole 305h has an electrical position of 90° in the direction of counter clockwise rotation. In this embodiment, the stator pole pair 305a and 305e, stator pole pair 305b and 305f, stator pole pair 305c and 305g, and stator pole pair 305d and 305h form the four phases of the SRM.

Similarly, in the illustrated embodiment of FIG. 4, the stator poles 405a-405j have corresponding electrical positions, where stator pole 405a has an electrical position of 180°, stator pole 405b has an electrical position of 252°, stator pole 405c has an electrical position of 324°, stator pole 405d has an electrical position of 36°, stator pole 405e has an electrical position of 108°, stator pole 405f has an electrical position of 180°, stator pole 405g has an electrical position of 252°, stator pole 405h has an electrical position of 324°, stator pole 405i has an electrical position of 36°, and stator pole 405j has an electrical position of 108°. In this embodiment, the stator pole pair 405a and 405f, stator pole pair 405b and 405g, stator pole pair 405c and 405h, stator pole pair 405d and 405i, and stator pole pair 405e and 405j form the five phases of the SRM.

Reference is next made to FIGS. 5-10, which illustrate example embodiments of SRMs according to the teachings herein. In the family of SRMs disclosed herein, the number of rotor poles of the SRMs is calculated so that the number of stator poles defined by the pole-phase index share the same electrical angle and, hence, constitute a phase.

For a given number of phases, pole-phase index and configuration index, the following equations are used to derive the number of rotor poles and accordingly, the configuration of the SRMs. The configurations can be used as part of a process for manufacturing a SRM.

For SRMs with number of phases, m=3, equations (5)-(8) apply.

$$N_r = \left(\frac{N_s}{m}\right)k\mathrm{ceil}\left(\frac{\mathrm{mod}(k,m)}{m}\right), \left(\frac{N_s}{m}\right) \in I_{even}^+ \quad (5)$$

$$\left(\frac{N_s}{m}\right) = \quad (6)$$

$$2 \Rightarrow k = \left\{\frac{m+1}{2}+4, \frac{m+1}{2}+5, \frac{m+1}{2}+6, \ldots\right\} - \left(\frac{m+1}{2}+8\right)$$

$$\left(\frac{N_s}{m}\right) = 4 \Rightarrow k = \left\{\frac{m+1}{2}+3, \frac{m+1}{2}+4, \frac{m+1}{2}+5, \ldots\right\} \quad (7)$$

$$\left(\frac{N_s}{m}\right) \geq 6 \Rightarrow k = \left(\frac{m+1}{2}+1, \frac{m+1}{2}+2, \frac{m+1}{2}+3, \ldots\right\} \quad (8)$$

Table I illustrates examples of SRM configurations and number of rotor poles for different combinations of pole-phase index, configuration index and number of stator poles when the number of phases, m=3.

TABLE I

Rotor Pole Count and SRM Configurations for m = 3

| number of phases (m) | pole-phase index (Ns/m) | configuration index (k) | number of stator poles (Ns) | number of rotor poles (Nr) | SRM |
|---|---|---|---|---|---|
| 3 | 2 | 7 | 6 | 14 | 6/14 |
|   |   | 8 | 6 | 16 | 6/16 |
|   |   | 11 | 6 | 22 | 6/22 |
|   |   | 13 | 6 | 26 | 6/26 |
|   |   | 14 | 6 | 28 | 6/28 |
|   | 4 | 5 | 12 | 20 | 12/20 |
|   |   | 7 | 12 | 28 | 12/28 |
|   |   | 8 | 12 | 32 | 12/32 |
|   |   | 10 | 12 | 40 | 12/40 |
|   |   | 11 | 12 | 44 | 12/44 |
|   | 6 | 4 | 18 | 24 | 18/24 |
|   |   | 5 | 18 | 30 | 18/30 |
|   |   | 7 | 18 | 42 | 18/42 |

TABLE I-continued

Rotor Pole Count and SRM Configurations for m = 3

| number of phases (m) | pole-phase index (Ns/m) | configuration index (k) | number of stator poles (Ns) | number of rotor poles (Nr) | SRM |
|---|---|---|---|---|---|
| | | 8 | 18 | 48 | 18/48 |
| | | 10 | 18 | 60 | 18/60 |
| | 8 | 4 | 24 | 32 | 24/32 |
| | | 5 | 24 | 40 | 24/40 |
| | | 7 | 24 | 56 | 24/56 |
| | | 8 | 24 | 64 | 24/64 |
| | | 10 | 24 | 80 | 24/80 |

For SRMs with the number of phases, m=4, equations (9)-(12) apply:

$$N_r = \left(\frac{N_s}{m}\right) k \operatorname{ceil}\left(\frac{\operatorname{mod}\left(k, \frac{m}{2}\right)}{\frac{m}{2}}\right), \left(\frac{N_s}{m}\right) \in I_{even}^+ \quad (9)$$

$$\left(\frac{N_s}{m}\right) = 2 \Rightarrow k = \left\{\frac{m+2}{2}+5, \frac{m+2}{2}+6, \frac{m+2}{2}+7, \ldots\right\} \quad (10)$$

$$\left(\frac{N_s}{m}\right) = 4 \Rightarrow k = \left\{\frac{m+2}{2}+3, \frac{m+2}{2}+4, \frac{m+2}{2}+5, \ldots\right\} \quad (11)$$

$$\left(\frac{N_s}{m}\right) \geq 6 \Rightarrow k = \left\{\frac{m+2}{2}+1, \frac{m+2}{2}+2, \frac{m+2}{2}+3, \ldots\right\} \quad (12)$$

Table II illustrates examples of SRM configurations and number of rotor poles for different combinations of pole-phase index, configuration index and number of stator poles when the number of phases, m=4.

TABLE II

Rotor Pole Count and SRM Configurations for m = 4

| number of phases (m) | pole-phase index (Ns/m) | configuration index (k) | number of stator poles (Ns) | number of rotor poles (Nr) | SRM |
|---|---|---|---|---|---|
| 4 | 2 | 9 | 8 | 18 | 8/18 |
| | | 11 | 8 | 22 | 8/22 |
| | | 13 | 8 | 26 | 8/26 |
| | | 15 | 8 | 30 | 8/30 |
| | | 17 | 8 | 34 | 8/34 |
| | 4 | 7 | 16 | 28 | 16/28 |
| | | 9 | 16 | 36 | 16/36 |
| | | 11 | 16 | 44 | 16/44 |
| | | 13 | 16 | 52 | 16/52 |
| | | 15 | 16 | 60 | 16/60 |
| | 6 | 5 | 24 | 30 | 24/30 |
| | | 7 | 24 | 42 | 24/42 |
| | | 9 | 24 | 54 | 24/54 |
| | | 11 | 24 | 66 | 24/66 |
| | | 13 | 24 | 78 | 24/78 |
| | 8 | 5 | 32 | 40 | 32/40 |
| | | 7 | 32 | 56 | 32/56 |
| | | 9 | 32 | 72 | 32/72 |
| | | 11 | 32 | 88 | 32/88 |
| | | 13 | 32 | 104 | 32/104 |

For SRMs with the number of phases, m=5, equations (13)-(16) apply:

$$N_r = \left(\frac{N_s}{m}\right) k \operatorname{ceil}\left(\frac{\operatorname{mod}(k, m)}{m}\right), \left(\frac{N_s}{m}\right) \in I_{even}^+ \quad (13)$$

$$\left(\frac{N_s}{m}\right) = 2 \Rightarrow k = \left\{\frac{m+1}{2}+4, \frac{m+1}{2}+5, \ldots\right\} - \left(\frac{m+1}{2}+6\right) \quad (14)$$

$$\left(\frac{N_s}{m}\right) = 4 \Rightarrow k = \left\{\frac{m+1}{2}+2, \frac{m+1}{2}+3, \frac{m+1}{2}+4, \ldots\right\} \quad (15)$$

$$\left(\frac{N_s}{m}\right) \geq 6 \Rightarrow k = \left\{\frac{m+1}{2}, \frac{m+1}{2}+1, \frac{m+1}{2}+2, \ldots\right\} \quad (16)$$

Table III illustrates examples of SRM configurations and number of rotor poles for different combinations of pole-phase index, configuration index and number of stator poles when the number of phases, m=5.

TABLE III

Rotor Pole Count and SRM Configurations for m = 5

| number of phases (m) | pole-phase index (Ns/m) | configuration index (k) | number of stator poles (Ns) | number of rotor poles (Nr) | SRM |
|---|---|---|---|---|---|
| 5 | 2 | 7 | 10 | 14 | 10/14 |
| | | 8 | 10 | 16 | 10/16 |
| | | 11 | 10 | 22 | 10/22 |
| | | 12 | 10 | 24 | 10/24 |
| | | 13 | 10 | 26 | 10/26 |
| | 4 | 6 | 20 | 24 | 20/24 |
| | | 7 | 20 | 28 | 20/28 |
| | | 8 | 20 | 32 | 20/32 |
| | | 9 | 20 | 36 | 20/36 |
| | | 11 | 20 | 44 | 20/44 |
| | 6 | 3 | 30 | 18 | 30/18 |
| | | 4 | 30 | 24 | 30/24 |
| | | 6 | 30 | 36 | 30/36 |
| | | 7 | 30 | 42 | 30/42 |
| | | 8 | 30 | 48 | 30/48 |
| | 8 | 3 | 40 | 24 | 40/24 |
| | | 4 | 40 | 32 | 40/32 |
| | | 6 | 40 | 48 | 40/48 |
| | | 7 | 40 | 56 | 40/56 |
| | | 8 | 40 | 64 | 40/64 |

For SRMs with the number of phases, m=6, equations (17)-(20) apply:

$$N_r = \left(\frac{N_s}{m}\right) k \operatorname{ceil}\left(\frac{\operatorname{mod}\left(k, \frac{m}{2}\right)}{\frac{m}{2}}\right), \left(\frac{N_s}{m}\right) \in I_{even}^+ \quad (17)$$

$$\left(\frac{N_s}{m}\right) = 2 \Rightarrow k = \left\{\frac{m+2}{2}+2, \frac{m+2}{2}+3, \ldots\right\} - \left\{\left(\frac{m+2}{2}+4\right), \left(\frac{m+2}{2}+7\right)\right\} \quad (18)$$

$$\left(\frac{N_s}{m}\right) = 4 \Rightarrow k = \left\{\frac{m+2}{2}+2, \frac{m+2}{2}+3, \frac{m+2}{2}+4, \ldots\right\} \quad (19)$$

$$\left(\frac{N_s}{m}\right) \geq 6 \Rightarrow k = \left\{\frac{m+2}{2}, \frac{m+2}{2}+1, \frac{m+2}{2}+2, \ldots\right\} \quad (20)$$

Table IV illustrates examples of SRM configurations and number of rotor poles for different combinations of pole-phase index, configuration index and number of stator poles when the number of phases, m=6.

TABLE IV

Rotor Pole Count and SRM Configurations for m = 6

| number of phases (m) | pole-phase index (Ns/m) | configuration index (k) | number of stator poles (Ns) | number of rotor poles (Nr) | SRM |
|---|---|---|---|---|---|
| 6 | 2 | 7 | 12 | 14 | 12/14 |
|   |   | 10 | 12 | 20 | 12/20 |
|   |   | 13 | 12 | 26 | 12/26 |
|   |   | 14 | 12 | 28 | 12/28 |
|   |   | 16 | 12 | 32 | 12/32 |
|   | 4 | 7 | 24 | 28 | 24/28 |
|   |   | 8 | 24 | 32 | 24/32 |
|   |   | 10 | 24 | 40 | 24/40 |
|   |   | 11 | 24 | 44 | 24/44 |
|   |   | 13 | 24 | 52 | 24/52 |
|   | 6 | 4 | 36 | 24 | 36/24 |
|   |   | 5 | 36 | 30 | 36/30 |
|   |   | 7 | 36 | 42 | 36/42 |
|   |   | 8 | 36 | 48 | 36/48 |
|   |   | 10 | 36 | 60 | 36/60 |
|   | 8 | 4 | 48 | 32 | 48/32 |
|   |   | 5 | 48 | 40 | 48/40 |
|   |   | 7 | 48 | 56 | 48/56 |
|   |   | 8 | 48 | 64 | 48/64 |
|   |   | 10 | 48 | 80 | 48/80 |

For SRMs with the number of phases, m=7, equations (21)-(23) apply:

$$N_r = \left(\frac{N_s}{m}\right) k \operatorname{ceil}\left(\frac{\operatorname{mod}(k, m)}{m}\right), \left(\frac{N_s}{m}\right) \in I_{even}^+ \quad (21)$$

$$\left(\frac{N_s}{m}\right) = 2 \Rightarrow k = \left\{\frac{m+1}{2}+5, \frac{m+1}{2}+6, \frac{m+1}{2}+7 \ldots\right\} - (N_s - 1) \quad (22)$$

$$\left(\frac{N_s}{m}\right) \geq 4 \Rightarrow k = \left\{\frac{m+1}{2}, \frac{m+1}{2}+1, \frac{m+1}{2}+2, \ldots\right\} \quad (23)$$

Table V illustrates examples of SRM configurations and number of rotor poles for different combinations of pole-phase index, configuration index and number of stator poles when the number of phases, m=7.

TABLE V

Rotor Pole Count and SRM Configurations for m = 7

| number of phases (m) | pole-phase index (Ns/m) | configuration index (k) | number of stator poles (Ns) | number of rotor poles (Nr) | SRM |
|---|---|---|---|---|---|
| 7 | 2 | 9 | 14 | 18 | 14/18 |
|   |   | 10 | 14 | 20 | 14/20 |
|   |   | 11 | 14 | 22 | 14/22 |
|   |   | 12 | 14 | 24 | 14/24 |
|   |   | 15 | 14 | 30 | 14/30 |
|   | 4 | 4 | 28 | 16 | 28/16 |
|   |   | 5 | 28 | 20 | 28/20 |
|   |   | 6 | 28 | 24 | 28/24 |
|   |   | 8 | 28 | 32 | 28/32 |
|   |   | 9 | 28 | 36 | 28/36 |
|   | 6 | 4 | 42 | 24 | 42/24 |
|   |   | 5 | 42 | 30 | 42/30 |
|   |   | 6 | 42 | 36 | 42/36 |
|   |   | 8 | 42 | 48 | 42/48 |
|   |   | 9 | 42 | 54 | 42/54 |
|   | 8 | 4 | 56 | 32 | 56/32 |
|   |   | 5 | 56 | 40 | 56/40 |
|   |   | 6 | 56 | 48 | 56/48 |
|   |   | 8 | 56 | 64 | 56/64 |
|   |   | 9 | 56 | 72 | 56/72 |

For SRMs with the number of phases, m=8, equations (24)-(26) apply:

$$N_r = \left(\frac{N_s}{m}\right) k \operatorname{ceil}\left(\frac{\operatorname{mod}\left(k, \frac{m}{2}\right)}{\frac{m}{2}}\right), \left(\frac{N_s}{m}\right) \in I_{even}^+ \quad (24)$$

$$\left(\frac{N_s}{m}\right) = 2 \Rightarrow k = \left\{\frac{m+2}{2}+2, \frac{m+2}{2}+3, \frac{m+2}{2}+4, \ldots\right\} - (N_s - 1) \quad (25)$$

$$\left(\frac{N_s}{m}\right) \geq 4 \Rightarrow k = \left\{\frac{m+2}{2}, \frac{m+2}{2}+1, \frac{m+2}{2}+2, \ldots\right\} \quad (26)$$

Table VI illustrates examples of SRM configurations and number of rotor poles for different combinations of pole-phase index, configuration index and number of stator poles when the number of phases, m=8.

TABLE VI

Rotor Pole Count and SRM Configurations for m = 8

| number of phases (m) | pole-phase index (Ns/m) | configuration index (k) | number of stator poles (Ns) | number of rotor poles (Nr) | SRM |
|---|---|---|---|---|---|
| 8 | 2 | 7 | 16 | 14 | 16/14 |
|   |   | 9 | 16 | 18 | 16/18 |
|   |   | 10 | 16 | 20 | 16/20 |
|   |   | 11 | 16 | 22 | 16/22 |
|   |   | 13 | 16 | 26 | 16/26 |
|   | 4 | 5 | 32 | 20 | 32/20 |
|   |   | 7 | 32 | 28 | 32/28 |
|   |   | 9 | 32 | 36 | 32/36 |
|   |   | 10 | 32 | 40 | 32/40 |
|   |   | 11 | 32 | 44 | 32/44 |
|   | 6 | 5 | 48 | 30 | 48/30 |
|   |   | 6 | 48 | 36 | 48/36 |
|   |   | 7 | 48 | 42 | 48/42 |
|   |   | 9 | 48 | 54 | 48/54 |
|   |   | 10 | 48 | 60 | 48/60 |
|   | 8 | 5 | 64 | 40 | 64/40 |
|   |   | 6 | 64 | 48 | 64/48 |
|   |   | 7 | 64 | 56 | 64/56 |
|   |   | 9 | 64 | 72 | 64/72 |
|   |   | 10 | 64 | 80 | 64/80 |

For SRMs with the number of phases, m=9, equations (27)-(29) apply:

$$N_r = \left(\frac{N_s}{m}\right) k \operatorname{ceil}\left(\frac{\operatorname{mod}(k, m)}{m}\right), \left(\frac{N_s}{m}\right) \in I_{even}^+ \quad (27)$$

$$\left(\frac{N_s}{m}\right) = 2 \Rightarrow k = \left\{\frac{m+1}{2}+3, \frac{m+1}{2}+4, \frac{m+1}{2}+5, \ldots\right\} - (N_s - 1) \quad (28)$$

$$\left(\frac{N_s}{m}\right) \geq 4 \Rightarrow k = \left\{\frac{m+1}{2}, \frac{m+1}{2}+1, \frac{m+1}{2}+2, \ldots\right\} \quad (29)$$

For SRMs with the number of phases, m equation (32) applies:

$$N_r = \begin{cases} \left(\frac{N_s}{m}\right)k\operatorname{ceil}\left(\frac{\operatorname{mod}(k,m)}{m}\right), m \in I_{odd}^+, \left(\frac{N_s}{m}\right) \in I_{even}^+, \\ k = \left\{\frac{m+1}{2}, \frac{m+1}{2}+1, \frac{m+1}{2}+2, \ldots\right\} - (N_s - 1) \\ \left(\frac{N_s}{m}\right)k\operatorname{ceil}\left(\frac{\operatorname{mod}\left(k,\frac{m}{2}\right)}{\frac{m}{2}}\right), m \in I_{even}^+, \left(\frac{N_s}{m}\right) \in I_{even}^+, \\ k = \left\{\frac{m+2}{2}, \frac{m+2}{2}+1, \frac{m+2}{2}+2, \ldots\right\} - (N_s - 1) \end{cases} \quad (30)$$

where $$\left(\frac{N_s}{m}\right)$$

is the pole-phase index and is expressed as the ratio between the number of stator poles, m is the number of phases, and k is the configuration index.

As previously mentioned, in the family of SRMs disclosed herein, the pole-phase index $$\left(\frac{N_s}{m}\right)$$

is an element or even positive integers $I_{even}^+$. In the various embodiments illustrated herein, the number of phases, m, can be either an even or an odd number. And, in various embodiments illustrated herein, k is the configuration index and it defines the number of rotor poles for the given number of stator poles and phases in the SRMs. In various embodiments illustrated herein, for a different number of phases, the configuration index has different ranges resulting in different configurations of SRMs. The configuration index can have any value within the given range.

In the previously disclosed equations, the "ceil" function acts as the selective part, which forces the results to be zero for the configurations that would not work in the SRM configurations disclosed herein. For a given configuration index and pole-phase index, if the calculated number of rotor poles does not create symmetry, the "ceil" function results in zero to signify that the selected configuration does not provide a symmetric design. This is illustrated by way of the following examples. For a pole-phase index of 4 in a three-phase SRM, the configuration indexes 7 and 8 provide a symmetric machine, whereas configuration index 9 does not. Therefore, $$k=7 \Rightarrow \operatorname{mod}(k,m)=\operatorname{mod}(7,3)=1$$

$$k=8 \Rightarrow \operatorname{mod}(k,m)=\operatorname{mod}(8,3)=2$$

$$k=9 \Rightarrow \operatorname{mod}(k,m)=\operatorname{mod}(9,3)=0$$

In the previously disclosed equations, when mod(k,m) is divided by m and then rounded up by the "ceil" function, the output will be 1 if mod(k,m) is not zero and this signifies that the number of rotor poles, calculated for the given pole-phase index and configuration index is a part of the SRMs disclosed herein. The same approach applies for an even number of phases if m is replaced by m/2.

Figure 5:
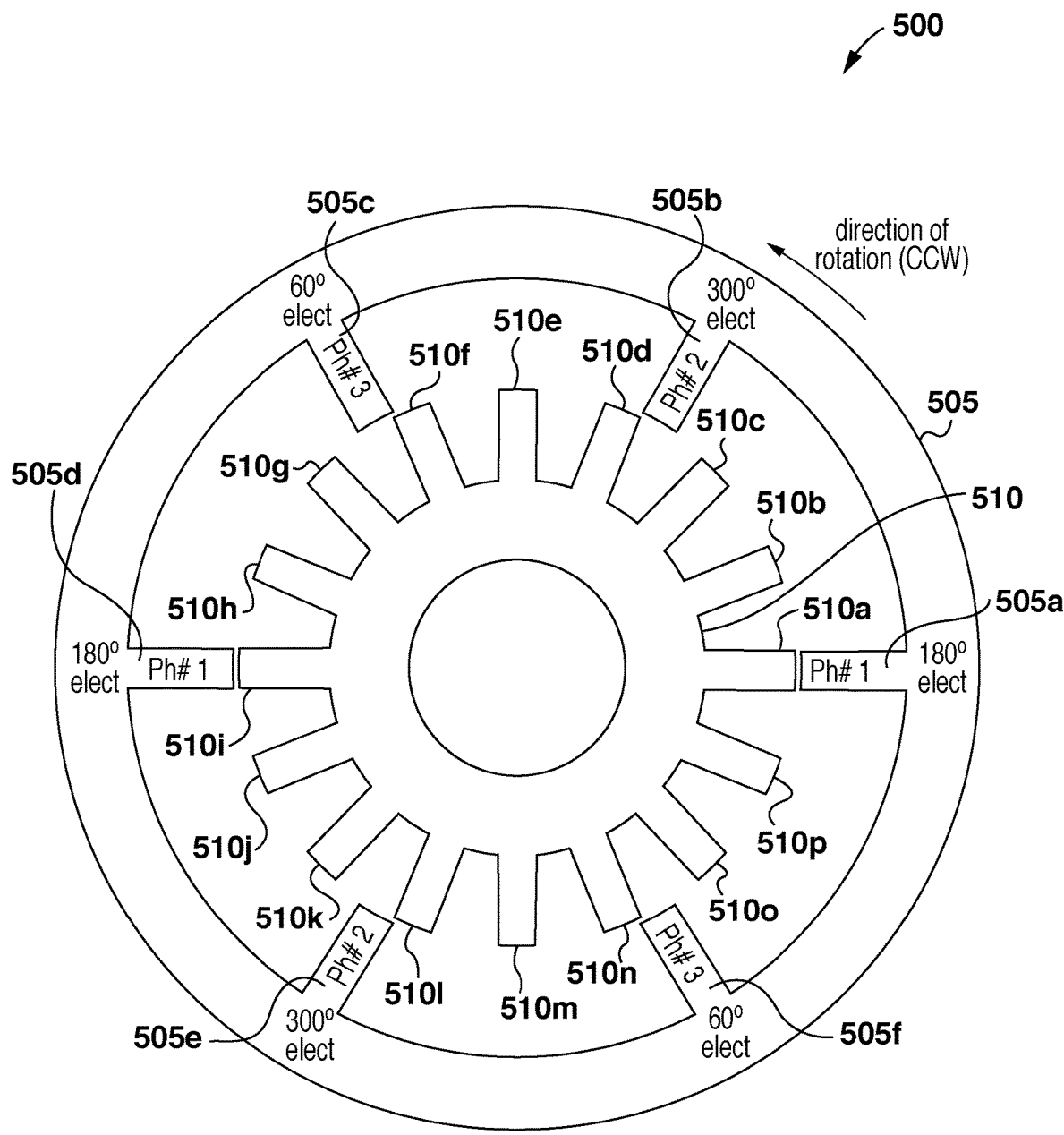
FIG. 5 illustrates a three-phase 6/16 switched reluctance machine according to an example embodiment.

Reference is next made to FIG. 5, which illustrates a cross-sectional view of a three-phase 6/16 SRM 500 according to an example embodiment. Using equations (5) and (6), the number of rotor poles and the configuration of the SRM 500, having three phases and six stator poles, can be verified.

In this embodiment, the SRM 500 has a pole-phase index of 2, which $\in I_{even}^+$. Equation (6) provides possible values for configuration index, k, including 7, 8, 11, 13, 14 etc. Assuming configuration index value to be 8, and substituting 2 for $$\left(\frac{N_s}{m}\right),$$

equation (5) results in $N_r=16$.

$$N_r = \left(\frac{N_s}{m}\right)k\operatorname{ceil}\left(\frac{\operatorname{mod}(k,m)}{m}\right) =$$

$$2 \times 8\operatorname{ceil}\left(\frac{\operatorname{mod}(8,3)}{3}\right) = 16 \times \operatorname{ceil}\left(\frac{2}{3}\right) = 16 \times 1 = 16$$

As illustrated, the SRM 500 has a stator 505 and a rotor 510 located inside the stator 505. SRM 500 comprises six stator poles and rotor 510 comprises sixteen rotor poles. Accordingly, the 6/16 SRM 500 includes a first stator pole 505a, a second stator pole 505b, a third stator pole 505c, a fourth stator pole 505d, a fifth stator pole 505e, and a sixth stator pole 505f. The 6/16 SRM 500 also includes a first rotor pole 510a, a second rotor pole 510b, a third rotor pole 510c, a fourth rotor pole 510d, a fifth rotor pole 510e, a sixth rotor pole 510f, a seventh rotor pole 510g, an eighth rotor pole 510h, a ninth rotor pole 510i, a tenth rotor pole 510j, an eleventh rotor pole 510k, a twelfth rotor pole 510l, a thirteenth rotor pole 510m, a fourteenth rotor pole 510n, a fifteenth rotor pole 510o and a sixteenth rotor pole 510p.

In the illustrated embodiment, the stator pole 505a has a mechanical angle of 0°, stator pole 505b has a mechanical angle of 60°, stator pole 505c has a mechanical angle of 120°, stator pole 505d has a mechanical angle of 180°, stator pole 505e has a mechanical angle of 240°, and stator pole 505f has a mechanical angle of 300°. As illustrated, rotor pole 510a has a mechanical angle of 0°, rotor pole 510b has a mechanical angle of 22.5°, rotor pole 510c has a mechanical angle of 45°, rotor pole 510d has a mechanical angle of 67.5°, rotor pole 510e has a mechanical angle of 90°, rotor pole 510f has a mechanical angle of 112.5°, rotor pole 510g has a mechanical angle of 135°, rotor pole 510h has a mechanical angle of 157.5°, rotor pole 510i has a mechanical angle of 180°, rotor pole 510j has a mechanical angle of 202.5°, rotor pole 510k has a mechanical angle of 225°, rotor pole 510l has a mechanical angle of 247.5°, rotor pole 510m has a mechanical angle of 270°, rotor pole 510n has a mechanical angle of 292.5°, rotor pole 510o has a mechanical angle of 315°, and rotor pole 510p has a mechanical angle of 337.5°.

In the illustrated embodiment, the stator poles 505a-505f have corresponding electrical positions. Stator pole 505a has an electrical position of 180°, stator pole 505b has an electrical position of 300°, stator pole 505c has an electrical position of 60°, stator pole 505d has an electrical position of 180°, stator pole 505e has an electrical position of 300°, and stator pole 505f has an electrical position of 60°.

As illustrated in FIG. 5, the number of stator pole pairs which share the same electrical angle is equal to the pole-phase index of the SRM 500. In this embodiment, the stator pole pair 505a and 505d, stator pole pair 505b and 505e, and stator pole pair 505c and 505f share the same electrical angle and form the three phases of the SRM. Accordingly, the number of stator pole pairs sharing the same electrical angle, i.e. 2, is equal to the pole-phase index, also 2, of the SRM 500. This maintains the symmetric configuration of the SRM 500.

Figure 6:
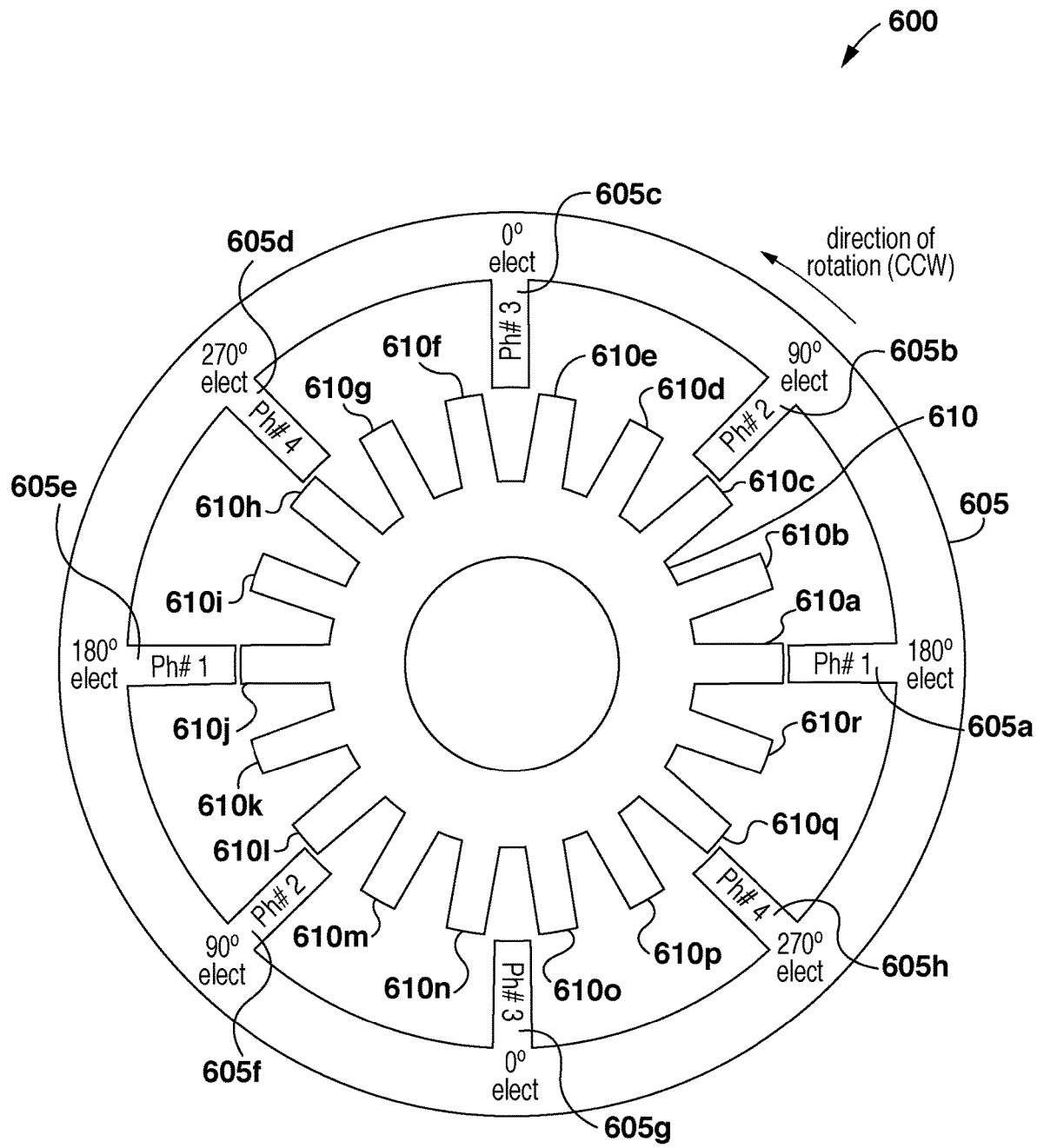
FIG. 6 illustrates a four-phase 8/18 switched reluctance machine according to an example embodiment.

Reference is next made to FIG. 6, which illustrates a cross-sectional view of a four-phase 8/18 SRM 600 according to an example embodiment. In this embodiment, the pole-phase index is 2 and the configuration index is 9. The SRM 600 illustrated herein has a stator 605 and a rotor 610 located inside the stator 605. Stator 605 comprises eight stator poles and rotor 610 comprises eighteen rotor poles. As illustrated, the 8/18 SRM 600 includes a first stator pole 605a, a second stator pole 605b, a third stator pole 605c, a fourth stator pole 605d, a fifth stator pole 605e, a sixth stator pole 605f, a seventh stator pole 605g and an eighth stator pole 605h. The 8/18 SRM 600 also includes a first rotor pole 610a, a second rotor pole 610b, a third rotor pole 610c, a fourth rotor pole 610d, a fifth rotor pole 610e, a sixth rotor pole 610f, a seventh rotor pole 610g, an eighth rotor pole 610h, a ninth rotor pole 610i, a tenth rotor pole 610j, an eleventh rotor pole 610k, a twelfth rotor pole 610l, a thirteenth rotor pole 610m, a fourteenth rotor pole 610n, a fifteenth rotor pole 610o, a sixteenth rotor pole 610p, a seventeenth rotor pole 610q and an eighteenth rotor pole 610r.

In the illustrated embodiment, the stator pole 605a has a mechanical angle of 0°, stator pole 605b has a mechanical angle of 45°, stator pole 605c has a mechanical angle of 90°, stator pole 605d has a mechanical angle of 135°, stator pole 605e has a mechanical angle of 180°, stator pole 605f has a mechanical angle of 225°, 605g has a mechanical angle of 270°, and stator pole 605h has a mechanical angle of 315°.

As illustrated, rotor pole 610a has a mechanical angle of 0°, rotor pole 610b has a mechanical angle of 20°, rotor pole 610c has a mechanical angle of 40°, rotor pole 610d has a mechanical angle of 60°, rotor pole 610e has a mechanical angle of 80°, rotor pole 610f has a mechanical angle of 100°, rotor pole 610g has a mechanical angle of 120°, rotor pole 610h has a mechanical angle of 140°, rotor pole 610i has a mechanical angle of 160°, rotor pole 610j has a mechanical angle of 180°, rotor pole 610k has a mechanical angle of 200°, rotor pole 610l has a mechanical angle of 220°, rotor pole 610m has a mechanical angle of 240°, rotor pole 610n has a mechanical angle of 260°, rotor pole 610o has a mechanical angle of 280°, rotor pole 610p has a mechanical angle of 300°, rotor pole 610q has a mechanical angle of 320°, and rotor pole 610r has a mechanical angle of 340°.

In the illustrated embodiment, the stator poles 605a-605h have corresponding electrical positions. Stator pole 605a has an electrical position of 180°, stator pole 605b has an electrical position of 90°, stator pole 605c has an electrical position of 0°, stator pole 605d has an electrical position of 270°, stator pole 605e has an electrical position of 180°, stator pole 605f has an electrical position of 90°, stator pole 605g has an electrical position of 0°, and stator pole 605h has an electrical position of 270°. In this embodiment, the stator pole pair 605a and 605e, stator pole pair 605b and 605f, stator pole pair 605c and 605g, and stator pole pair 605d and 605h form the four phases of the SRM.

Figure 7:
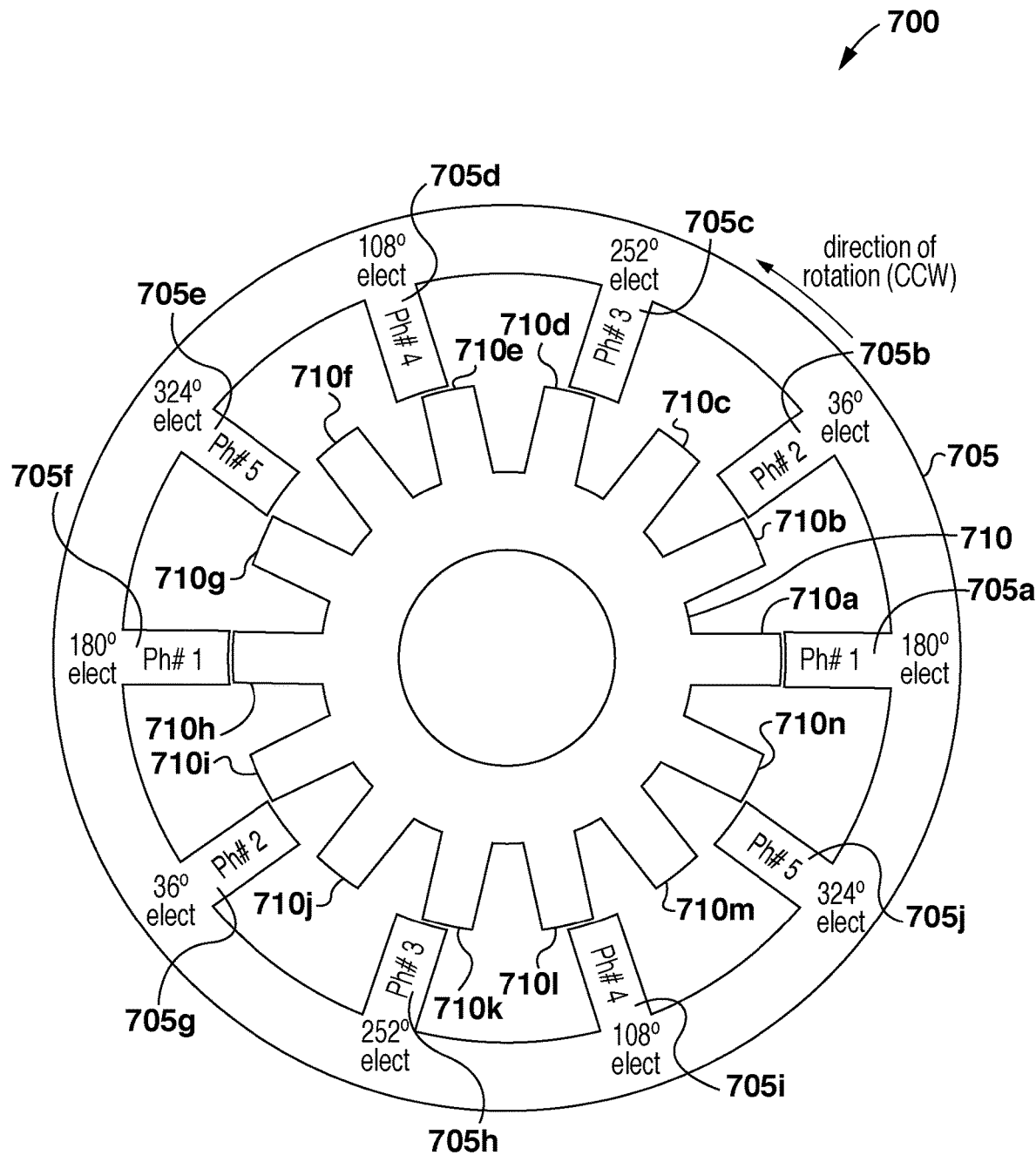
FIG. 7 illustrates a five-phase 10/14 switched reluctance machine according to an example embodiment.

Reference is next made to FIG. 7, which illustrates a cross-sectional view of a five-phase 10/14 SRM 700 according to an example embodiment. In this embodiment, the pole-phase index is 2 and the configuration index is 7. The SRM 700 illustrated herein has a stator 705 and a rotor 710 located inside the stator 705. Stator 705 comprises ten stator poles and rotor 710 comprises fourteen rotor poles. Accordingly, the 10/14 SRM 700 includes a first stator pole 705a, a second stator pole 705b, a third stator pole 705c, a fourth stator pole 705d, a fifth stator pole 705e, a sixth stator pole 705f, a seventh stator pole 705g, an eighth stator pole 705h, a ninth stator pole 705i and a tenth stator pole 705j. The 10/14 SRM 700 also includes a first rotor pole 710a, a second rotor pole 710b, a third rotor pole 710c, a fourth rotor pole 710d, a fifth rotor pole 710e, a sixth rotor pole 710f, a seventh rotor pole 710g, an eighth rotor pole 710h, a ninth rotor pole 710i, a tenth rotor pole 710j, an eleventh rotor pole 710k, a twelfth rotor pole 710l, a thirteenth rotor pole 710m and a fourteenth rotor pole 710n.

In the illustrated embodiment, the stator pole 705a has a mechanical angle of 0°, stator pole 705b has a mechanical angle of 36°, stator pole 705c has a mechanical angle of 72°, stator pole 705d has a mechanical angle of 108°, stator pole 705e has a mechanical angle of 144°, stator pole 705f has a mechanical angle of 180°, stator pole 705g has a mechanical angle of 216°, stator pole 705h has a mechanical angle of 252°, stator pole 705i has a mechanical angle of 288°, and stator pole 705j has a mechanical angle of 324°.

As illustrated, rotor pole 710a has a mechanical angle of 0°, rotor pole 710b has a mechanical angle of approximately 25.7°, rotor pole 710c has a mechanical angle of approximately 51.4°, rotor pole 710d has a mechanical angle of approximately 77.1°, rotor pole 710e has a mechanical angle of approximately 102.9°, rotor pole 710f has a mechanical angle of approximately 128.6°, rotor pole 710g has a mechanical angle of approximately 154.3°, rotor pole 710h has a mechanical angle of 180°, rotor pole 710i has a mechanical angle of approximately 205.7°, rotor pole 710j has a mechanical angle of approximately 231.4°, rotor pole 710k has a mechanical angle of approximately 257.1°, rotor pole 710l has a mechanical angle of approximately 282.9°, rotor pole 710m has a mechanical angle of approximately 308.6°, and rotor pole 710n has a mechanical angle of approximately 334.3°.

In the illustrated embodiment, the stator poles 705a-705j have corresponding electrical positions. Stator pole 705a has an electrical position of 180°, stator pole 705b has an electrical position of 36°, stator pole 705c has an electrical position of 252°, stator pole 705d has an electrical position of 108°, stator pole 705e has an electrical position of 324°, stator pole 705f has an electrical position of 180°, stator pole 705g has an electrical position of 36°, stator pole 705h has an electrical position of 252°, stator pole 705i has an electrical position of 108°, and stator pole 705j has an electrical position of 324°. In this embodiment, the stator pole pair 705a and 705f, stator pole pair 705b and 705g, stator pole pair 705c and 705h, stator pole pair 705d and 705i, and stator pole pair 705e and 705j form the five phases of the SRM.

Figure 8:
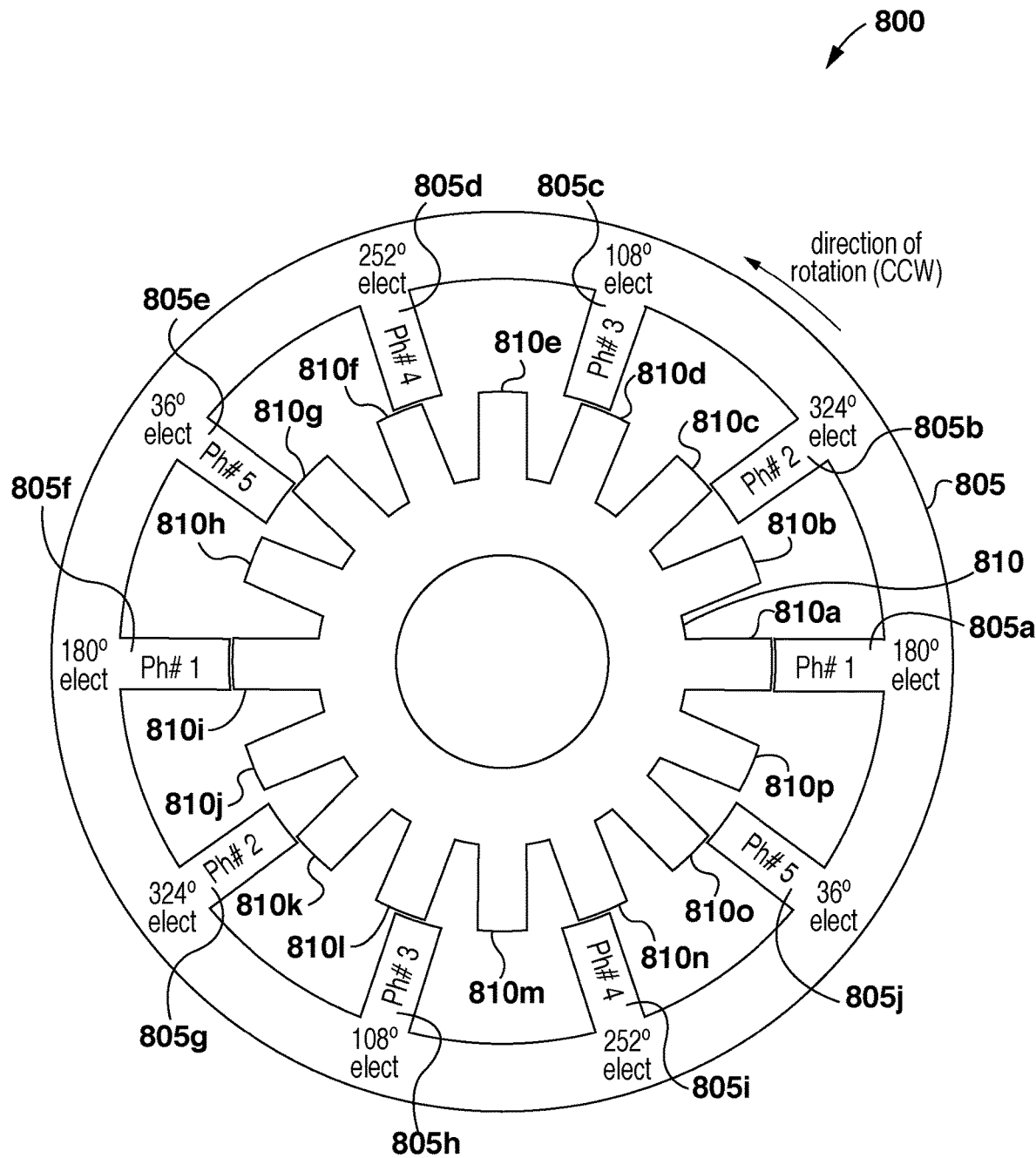
FIG. 8 illustrates a five-phase 10/16 switched reluctance machine according to an example embodiment.

Reference is next made to FIG. 8, which illustrates a cross-sectional view of a five-phase 10/16 SRM 800 according to an example embodiment. In this embodiment, the pole-phase index is 2 and the configuration index is 8. The SRM 800 illustrated herein has a stator 805 and a rotor 810 located inside the stator 805. Stator 805 comprises ten stator poles and rotor 810 comprises sixteen rotor poles. Accordingly, the 10/16 SRM 800 includes a first stator pole 805a, a second stator pole 805b, a third stator pole 805c, a fourth stator pole 805d, a fifth stator pole 805e, a sixth stator pole 805f, a seventh stator pole 805g, an eighth stator pole 805h, a ninth stator pole 805i and a tenth stator pole 805j. The 10/16 SRM 800 also includes a first rotor pole 810a, a second rotor pole 810b, a third rotor pole 810c, a fourth rotor pole 810d, a fifth rotor pole 810e, a sixth rotor pole 810f, a seventh rotor pole 810g, an eighth rotor pole 810h, a ninth rotor pole 810i, a tenth rotor pole 810j, an eleventh rotor pole 810k, a twelfth rotor pole 810l, a thirteenth rotor pole 810m, a fourteenth rotor pole 810n, a fifteenth rotor pole 810o and a sixteenth rotor pole 810p.

In the illustrated embodiment, the stator pole 805a has a mechanical angle of 0°, stator pole 805b has a mechanical angle of 36°, stator pole 805c has a mechanical angle of 72°, stator pole 805d has a mechanical angle of 108°, stator pole 805e has a mechanical angle of 144°, stator pole 805f has a mechanical angle of 180°, stator pole 805g has a mechanical angle of 216°, stator pole 805h has a mechanical angle of 252°, stator pole 805i has a mechanical angle of 288°, and stator pole 805j has a mechanical angle of 324°.

As illustrated, rotor pole 810a has a mechanical angle of 0°, rotor pole 810b has a mechanical angle of 22.5°, rotor pole 810c has a mechanical angle of 45°, rotor pole 810d has a mechanical angle of 67.5°, rotor pole 810e has a mechanical angle of 90°, rotor pole 810f has a mechanical angle of 112.5°, rotor pole 810g has a mechanical angle of 135°, rotor pole 810h has a mechanical angle of 157.5°, rotor pole 810i has a mechanical angle of 180°, rotor pole 810j has a mechanical angle of 202.5°, rotor pole 810k has a mechanical angle of 225°, rotor pole 810l has a mechanical angle of 247.5°, rotor pole 810m has a mechanical angle of 270°, rotor pole 810n has a mechanical angle of 292.5°, rotor pole 810o has a mechanical angle of 315°, and rotor pole 810p has a mechanical angle of 337.5°.

In the illustrated embodiment, the stator poles 805a-805j have corresponding electrical positions. Stator pole 805a has an electrical position of 180°, stator pole 805b has an electrical position of 324°, stator pole 805c has an electrical position of 108°, stator pole 805d has an electrical position of 252°, stator pole 805e has an electrical position of 36°, stator pole 805f has an electrical position of 180°, stator pole 805g has an electrical position of 324°, stator pole 805h has an electrical position of 108°, stator pole 805i has an electrical position of 252°, and stator pole 805j has an electrical position of 36°. In this embodiment, the stator pole pair 805a and 805f, stator pole pair 805b and 805g, stator pole pair 805c and 805h, stator pole pair 805d and 805i, and stator pole pair 805e and 805j form the five phases of the SRM.

In the embodiments illustrated in FIGS. 7 and 8, the same electrical positions appear in the SRMs 700 and 800 but in different stator poles. For example, the same electrical positions 36°, 108°, 180°, 252°, and 324° appear in the SRM 700 and SRM 800 of FIGS. 7 and 8 respectively. However, the electrical positions appear in different stator poles in these embodiments. In these cases, both the SRMs 700 and 800 can operate but by energizing the phases in a different order. The selection of one SRM over the other can be based on the performance requirements of the SRM.

Figure 9:
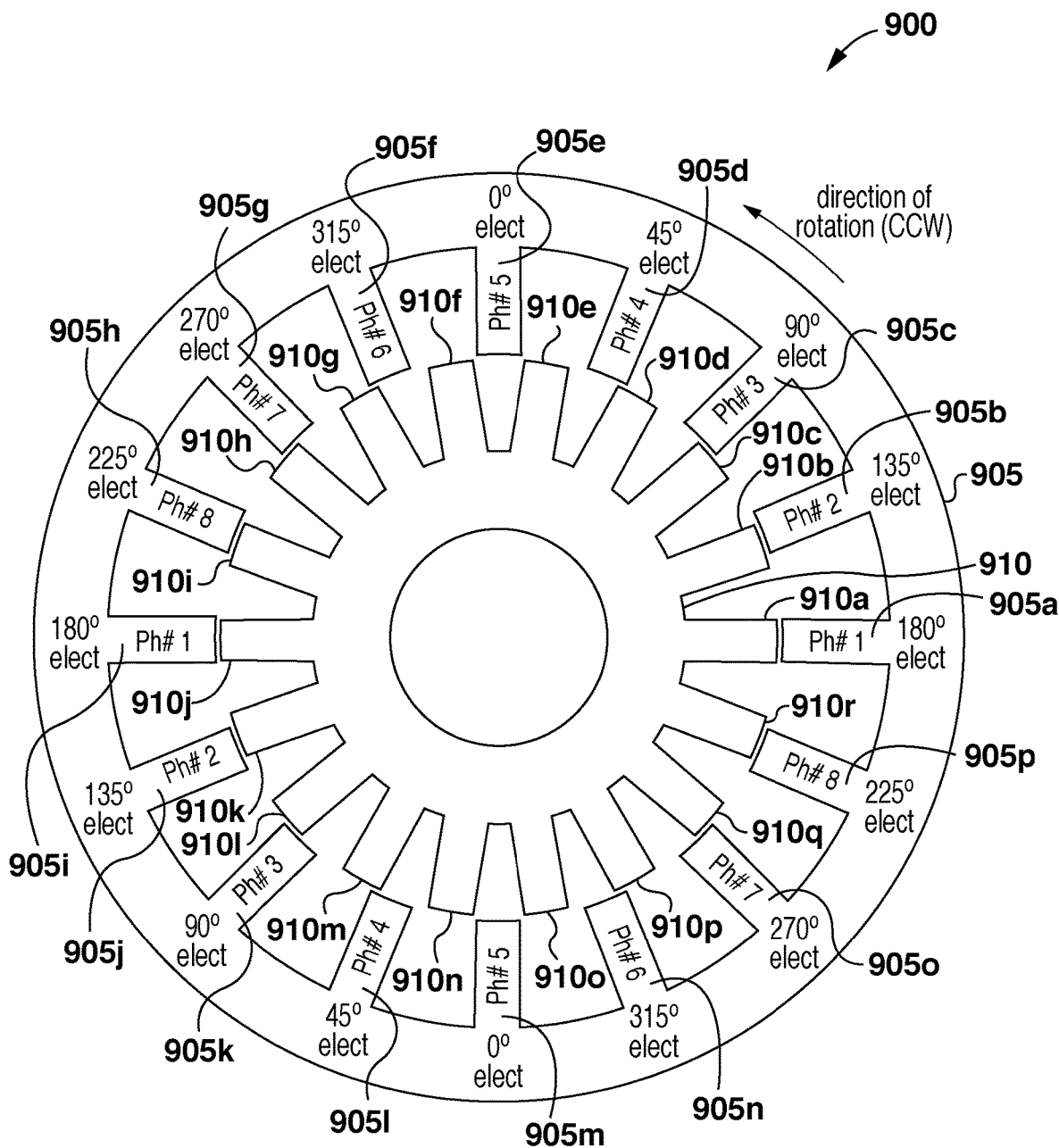
FIG. 9 illustrates an eight-phase 16/18 switched reluctance machine according to an example embodiment.

Reference is next made to FIG. 9, which illustrates a cross-sectional view of an eight-phase 16/18 SRM 900 according to an example embodiment. In this embodiment, the pole-phase index is 2 and the configuration index is 9. The SRM 900 illustrated herein has a stator 905 and a rotor 910 located inside the stator 905. Stator 905 comprises sixteen stator poles and rotor 910 comprises eighteen rotor poles. Accordingly, the 16/18 SRM 900 includes a first stator pole 905a, a second stator pole 905b, a third stator pole 905c, a fourth stator pole 905d, a fifth stator pole 905e, a sixth stator pole 905f, a seventh stator pole 905g, an eighth stator pole 905h, a ninth stator pole 905i, a tenth stator pole 905j, an eleventh stator pole 905k, a twelfth stator pole 905l, a thirteenth stator pole 905m, a fourteenth stator pole 905n, a fifteenth stator pole 905o, and a sixteenth stator pole 905p.

The 16/18 SRM 900 also includes a first rotor pole 910a, a second rotor pole 910b, a third rotor pole 910c, a fourth rotor pole 910d, a fifth rotor pole 910e, a sixth rotor pole 910f, a seventh rotor pole 910g, an eighth rotor pole 910h, a ninth rotor pole 910i, a tenth rotor pole 910j, an eleventh rotor pole 910k, a twelfth rotor pole 910l, a thirteenth rotor pole 910m, a fourteenth rotor pole 910n, a fifteenth rotor pole 910o, and a sixteenth rotor pole 910p, a seventeenth rotor pole 910q, and an eighteenth rotor pole 910r.

In the illustrated embodiment, the stator pole 905a has a mechanical angle of 0°, stator pole 905b has a mechanical angle of 22.5°, stator pole 905c has a mechanical angle of 45°, stator pole 905d has a mechanical angle of 67.5°, stator pole 905e has a mechanical angle of 90°, stator pole 905f has a mechanical angle of 112.5°, stator pole 905g has a mechanical angle of 135°, stator pole 905h has a mechanical angle of 157.5°, stator pole 905i has a mechanical angle of 180°, stator pole 905j has a mechanical angle of 202.5°, stator pole 905k has a mechanical angle of 225°, stator pole 905l has a mechanical angle of 247.5°, stator pole 905m has a mechanical angle of 270°, stator pole 905n has a mechanical angle of 292.5°, stator pole 905o has a mechanical angle of 315°, and stator pole 905p has a mechanical angle of 337.5°.

As illustrated, rotor pole 910a has a mechanical angle of 0°, rotor pole 910b has a mechanical angle of 20°, rotor pole 910c has a mechanical angle of 40°, rotor pole 910d has a mechanical angle of 60°, rotor pole 910e has a mechanical angle of 80°, rotor pole 910f has a mechanical angle of 100°, rotor pole 910g has a mechanical angle of 120°, rotor pole 910h has a mechanical angle of 140°, rotor pole 910i has a mechanical angle of 160°, rotor pole 910j has a mechanical angle of 180°, rotor pole 910k has a mechanical angle of 200°, rotor pole 910l has a mechanical angle of 220°, rotor pole 910m has a mechanical angle of 240°, rotor pole 910n has a mechanical angle of 260°, rotor pole 910o has a mechanical angle of 280°, rotor pole 910p has a mechanical angle of 300°, rotor pole 910q has a mechanical angle of 320°, and rotor pole 910r has a mechanical angle of 340°.

In the illustrated embodiment, the stator poles 905a-905p have corresponding electrical positions. Stator pole 905a has an electrical position of 180°, stator pole 905b has an electrical position of 135°, stator pole 905c has an electrical position of 90°, stator pole 905d has an electrical position of 45°, stator pole 905e has an electrical position of 0°, stator pole 905f has an electrical position of 315°, stator pole 905g has an electrical position of 270°, stator pole 905h has an electrical position of 225°, stator pole 905i has an electrical position of 180°, stator pole 905j has an electrical position of 135°, stator pole 905k has an electrical position of 90°, stator pole 905l has an electrical position of 45°, stator pole 905m has an electrical position of 0°, stator pole 905n has an electrical position of 315°, stator pole 905o has an electrical position of 270°, and stator pole 905p has an electrical position of 225°. In this embodiment, the stator pole pair 905a and 905i, stator pole pair 905b and 905j, stator pole pair 905c and 905k, stator pole pair 905d and 905l, stator pole pair 905e and 905m, stator pole pair 905f and 905n, stator pole pair 905g and 905o, and stator pole pair 905h and 905p form the eight phases of the SRM.

Figure 10:
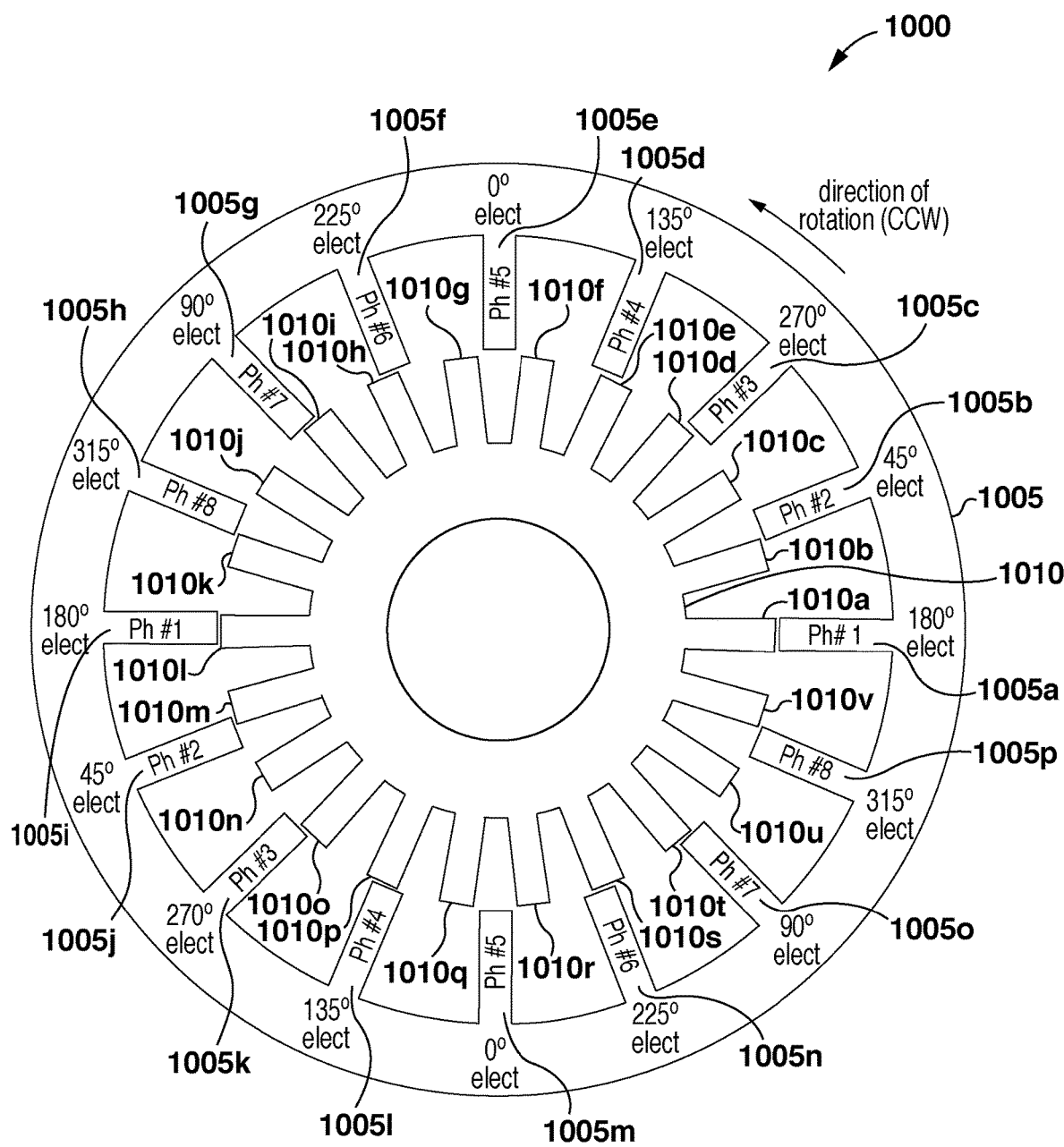
FIG. 10 illustrates an eight-phase 16/22 switched reluctance machine according to an example embodiment.

Reference is next made to FIG. 10, which illustrates a cross-sectional view of an eight-phase 16/22 SRM 1000 according to an example embodiment. In this embodiment, the pole-phase index is 2 and the configuration index is 11. The SRM 1000 illustrated herein has a stator 1005 and a rotor 1010 located inside the stator 1005. Stator 1005 comprises sixteen stator poles and rotor 1010 comprises twenty-two rotor poles. Accordingly, the 16/22 SRM 1000 includes a first stator pole 1005a, a second stator pole 1005b, a third stator pole 1005c, a fourth stator pole 1005d, a fifth stator pole 1005e, a sixth stator pole 1005f, a seventh stator pole 1005g, an eighth stator pole 1005h, a ninth stator pole 1005i, a tenth stator pole 1005j, an eleventh stator pole 1010k, a twelfth stator pole 1010l, a thirteenth stator pole 1010m, a fourteenth stator pole 1010n, a fifteenth stator pole 1010o, and a sixteenth stator pole 1010p.

The 16/22 SRM 1000 also includes a first rotor pole 1010a, a second rotor pole 1010b, a third rotor pole 1010c, a fourth rotor pole 1010d, a fifth rotor pole 1010e, a sixth rotor pole 1010f, a seventh rotor pole 1010g, an eighth rotor pole 1010h, a ninth rotor pole 1010i, a tenth rotor pole 1010j, an eleventh rotor pole 1010k, a twelfth rotor pole 1010l, a thirteenth rotor pole 1010m, a fourteenth rotor pole 1010n, a fifteenth rotor pole 1010o, a sixteenth rotor pole 1010p, a seventeenth rotor pole 1010q, an eighteenth rotor pole 1010r, a nineteenth rotor pole 1010s, a twentieth rotor pole 1010t, a twenty-first rotor pole 1010u and a twenty-second rotor pole 1010v.

In the illustrated embodiment, the stator pole 1005a has a mechanical angle of 0°, stator pole 1005b has a mechanical angle of 22.5°, stator pole 1005c has a mechanical angle of 45°, stator pole 1005d has a mechanical angle of 67.5°, stator pole 1005e has a mechanical angle of 100°, stator pole 1005f has a mechanical angle of 112.5°, stator pole 1005g has a mechanical angle of 135°, stator pole 1005h has a mechanical angle of 157.5°, stator pole 1005i has a mechanical angle of 180°, stator pole 1005j has a mechanical angle of 202.5°, stator pole 1005k has a mechanical angle of 225°, stator pole 1005l has a mechanical angle of 247.5°, stator pole 1005m has a mechanical angle of 270°, stator pole 1005n has a mechanical angle of 292.5°, stator pole 1005o has a mechanical angle of 315°, and stator pole 1005p has a mechanical angle of 337.5°.

As illustrated, rotor pole 1010a has a mechanical angle of 0°, rotor pole 1010b has a mechanical angle of approximately 16.4°, rotor pole 1010c has a mechanical angle of approximately 32.7°, rotor pole 1010d has a mechanical angle of approximately 49.1°, rotor pole 1010e has a mechanical angle of approximately 65.5°, rotor pole 1010f has a mechanical angle of approximately 81.8°, rotor pole 1010g has a mechanical angle of approximately 98.2°, rotor pole 1010h has a mechanical angle of approximately 114.5°, rotor pole 1010i has a mechanical angle of approximately 130.9°, rotor pole 1010j has a mechanical angle of approximately 147.3°, rotor pole 1010k has a mechanical angle of approximately 163.6°, rotor pole 1010l has a mechanical angle of approximately 180°, rotor pole 1010m has a mechanical angle of approximately 196.4°, rotor pole 1010n has a mechanical angle of approximately 212.7°, rotor pole 1010o has a mechanical angle of approximately 229.1°, rotor pole 1010p has a mechanical angle of approximately 245.5°, rotor pole 1010q has a mechanical angle of approximately 261.8°, rotor pole 1010r has a mechanical angle of approximately 278.2°, rotor pole 1010s has a mechanical angle of approximately 294.5°, rotor pole 1010t has a mechanical angle of approximately 310.9°, rotor pole 1010u has a mechanical angle of approximately 327.3°, and rotor pole 1010v has a mechanical angle of approximately 343.6°.

In the illustrated embodiment, the stator poles 1005a-1005p have corresponding electrical positions. Stator pole 1005a has an electrical position of 180°, stator pole 1005b has an electrical position of 45°, stator pole 1005c has an electrical position of 270°, stator pole 1005d has an electrical position of 135°, stator pole 1005e has an electrical position of 0°, stator pole 1005f has an electrical position of 225°, stator pole 1005g has an electrical position of 90°, stator pole 1005h has an electrical position of 315°, stator pole 1005i has an electrical position of 180°, stator pole 1005j has an electrical position of 45°, stator pole 1005k has an electrical position of 270°, stator pole 1005l has an electrical position of 135°, stator pole 1005m has an electrical position of 0°, stator pole 1005n has an electrical position of 225°, stator pole 1005o has an electrical position of 90°, and stator pole 1005p has an electrical position of 315°.

In this embodiment, the stator pole pair 1005a and 1005i, stator pole pair 1005b and 1005j, stator pole pair 1005c and 1005k, stator pole pair 1005d and 1005l, stator pole pair 1005e and 1005m, stator pole pair 1005f and 1005n, stator pole pair 1005g and 1005o, and stator pole pair 1005h and 1005p form the eight phases of the SRM.

In the embodiments illustrated in FIGS. 9 and 10, the same electrical positions appear in the SRMs 900 and 1000 but in different stator poles. For example, the same electrical positions 0°, 45°, 90°, 135°, 180°, 225°, 270°, and 315° appear in the SRM 900 and SRM 1000 of FIGS. 9 and 10 respectively. However, the electrical positions appear in different stator poles in these embodiments. In these cases, both the SRMs 900 and 1000 can operate but by energizing the phases in a different order. The selection of one SRM over the other can be based on the performance requirements of the SRM.

The various embodiments and the teachings disclosed herein can provide SRM manufacturers, users, designers etc. with an additional degree of freedom to realize better efficiency, reduced noise and torque ripple, desirable torque-speed profiles, higher power density and superior torque characteristics. In SRM configurations disclosed herein, the rotor and stator dimensions, coil parameters and other factors can be adjusted for a given pole-phase index and calculated number of rotor poles based on the performance requirements of the SRMs.

The above-described embodiments and applications of the present invention are intended only to be examples. Alterations, modifications and variations may be effected to the particular embodiments by those of ordinary skill in the art, in light of this teaching, without departing from the scope of the claimed invention.

The invention claimed is:
1. A switched reluctance machine comprising:
a stator including a predetermined number of stator poles, wherein each stator pole is a salient pole, wherein the stator has only a single tooth per stator pole;
a rotor rotatably mounted with respect to the stator, the rotor comprising a plurality of rotor poles, wherein the plurality of rotor poles are salient poles; and
a plurality of coils provided around the predetermined number of stator poles to form at least one phase of the switched reluctance machine, the plurality of coils adapted to carry electric current to generate magnetic flux,
wherein the plurality of rotor poles and the predetermined number of stator poles are symmetrically disposed, and
wherein a number of rotor poles is related to the predetermined number of stator poles and a number of phases according to:

$$\left(\frac{N_s}{m}\right)k\mathrm{ceil}\left(\frac{\mathrm{mod}(k,m)}{m}\right),$$

if the number of phases is an odd number, and $$\left(\frac{N_s}{m}\right)k\mathrm{ceil}\left(\frac{\mathrm{mod}\left(k,\frac{m}{2}\right)}{\frac{m}{2}}\right),$$

if the number of phases is an even number,
wherein $N_s$ is the predetermined number of stator poles, m is the number of phases, and k is a configuration index based on the predetermined number of stator poles and the number of phases,
wherein a pole-phase index is an even number, the pole-phase index being a ratio of the predetermined number of stator poles to the number of phases.

2. The switched reluctance machine of claim 1, wherein if the number of phases is 3 and the pole-phase index is 2, the configuration index is determined according to:

$$k = \left\{\frac{m+1}{2}+4, \frac{m+1}{2}+5, \frac{m+1}{2}+6, \ldots\right\} - \left(\frac{m+1}{2}+8\right).$$

3. The switched reluctance machine of claim 1, wherein if the number of phases is 3 and the pole-phase index is 4, the configuration index is determined according to:

$$k = \left\{\frac{m+1}{2}+3, \frac{m+1}{2}+4, \frac{m+1}{2}+5, \ldots\right\}.$$

4. The switched reluctance machine of claim 1, wherein if the number of phases is 3 and the pole-phase index is equal to or greater than 6, the configuration index is determined according to:

$$k = \left\{\frac{m+1}{2}+1, \frac{m+1}{2}+2, \frac{m+1}{2}+3, \ldots\right\}.$$

5. The switched reluctance machine of claim 1, wherein if the number of phases is 4 and the pole-phase index is 2, the configuration index is determined according to:

$$k = \left\{\frac{m+2}{2}+5, \frac{m+2}{2}+6, \frac{m+2}{2}+7, \ldots\right\}.$$

6. The switched reluctance machine of claim 1, wherein if the number of phases is 4 and the pole-phase index is 4, the configuration index is determined according to:

$$k = \left\{\frac{m+2}{2}+3, \frac{m+2}{2}+4, \frac{m+2}{2}+5, \ldots\right\}.$$

7. The switched reluctance machine of claim 1, wherein if the number of phases is 4 and the pole-phase index is equal to or greater than 6, the configuration index is determined according to:

$$k = \left\{\frac{m+2}{2}+1, \frac{m+2}{2}+2, \frac{m+2}{2}+3, \ldots\right\}.$$

8. The switched reluctance machine of claim 1, wherein if the number of phases is 5 and the pole-phase index is 2, the configuration index is determined according to:

$$k = \left\{\frac{m+1}{2}+4, \frac{m+1}{2}+5, \ldots\right\} - \left(\frac{m+1}{2}+6\right).$$

9. The switched reluctance machine of claim 1, wherein if the number of phases is 5 and the pole-phase index is 4, the configuration index is determined according to:

$$k = \left\{\frac{m+1}{2}+2, \frac{m+1}{2}+3, \frac{m+1}{2}+4, \ldots\right\}.$$

10. The switched reluctance machine of claim 1, wherein if the number of phases is 5 and the pole-phase index is equal to or greater than 6, the configuration index is determined according to:

$$k = \left\{\frac{m+1}{2}, \frac{m+1}{2}+1, \frac{m+1}{2}+2, \ldots\right\}.$$

11. The switched reluctance machine of claim 1, wherein if the number of phases is 6 and the pole-phase index is 4, the configuration index is determined according to:

$$k = \left\{\frac{m+2}{2}+2, \frac{m+2}{2}+3, \frac{m+2}{2}+4, \ldots\right\}.$$

12. The switched reluctance machine of claim 1, wherein if the number of phases is 6 and the pole-phase index is equal to or greater than 6, the configuration index is determined according to:

$$k = \left\{\frac{m+2}{2}, \frac{m+2}{2}+1, \frac{m+2}{2}+2, \ldots\right\}.$$

13. The switched reluctance machine of claim 1, wherein if the number of phases is 7 and the pole-phase index is 2, the configuration index is determined according to:

$$k = \left\{\frac{m+1}{2}+5, \frac{m+1}{2}+6, \frac{m+1}{2}+7 \ldots\right\} - (N_s - 1).$$

14. The switched reluctance machine of claim 1, wherein if the number of phases is 7 and the pole-phase index is equal to or greater than 4, the configuration index is determined according to:

$$k = \left\{\frac{m+1}{2}, \frac{m+1}{2}+1, \frac{m+1}{2}+2, \ldots\right\}.$$

15. The switched reluctance machine of claim 1, wherein if the number of phases is 8 and the pole-phase index is 2, the configuration index is determined according to:

$$k = \left\{\frac{m+2}{2}+2, \frac{m+2}{2}+3, \frac{m+2}{2}+4, ...\right\} - (N_s - 1).$$

16. The switched reluctance machine of claim 1, wherein if the number of phases is 8 and the pole-phase index is equal to or greater than 4, the configuration index is determined according to:

$$k = \left\{\frac{m+2}{2}, \frac{m+2}{2}+1, \frac{m+2}{2}+2, ...\right\}.$$

17. The switched reluctance machine of claim 1, wherein if the number of phases is 9 and the pole-phase index is 2, the configuration index is determined according to:

$$k = \left\{\frac{m+1}{2}+3, \frac{m+1}{2}+4, \frac{m+1}{2}+5 \, ...\right\} - (N_s - 1).$$

18. The switched reluctance machine of claim 1, wherein if the number of phases is 9 and the pole-phase index is equal to or greater than 4, the configuration index is determined according to:

$$k = \left\{\frac{m+1}{2}, \frac{m+1}{2}+1, \frac{m+1}{2}+2, ...\right\}.$$

19. The switched reluctance machine of claim 1, wherein if the number of phases is equal to or greater than 10, the configuration index is determined according to:

$$k = \left\{\frac{m+2}{2}, \frac{m+2}{2}+1, \frac{m+2}{2}+2, ...\right\} - (N_s - 1),$$

if the number of phases is an even number, and $$k = \left\{\frac{m+1}{2}, \frac{m+1}{2}+1, \frac{m+1}{2}+2, ...\right\} - (N_s - 1),$$

if the number of phases is an odd number.

20. A method for manufacturing a switched reluctance machine having a plurality of rotor poles and a predetermined number of stator poles comprising:
  determining a number of phases and the predetermined number of stator poles;
  determining a number of the rotor poles based on the predetermined number of stator poles and the number of phases according to $$\left(\frac{N_s}{m}\right) k \; \text{ceil}\left(\frac{\text{mod}(k, m)}{m}\right),$$

if the number of phases is an odd number, and $$\left(\frac{N_s}{m}\right) k \; \text{ceil}\left(\frac{\text{mod}\left(k, \frac{m}{2}\right)}{\frac{m}{2}}\right),$$

if the number of phases is an even number,
  wherein $N_s$ is the predetermined number of stator poles, m is the number of phases, and k is a configuration index based on the predetermined number of stator poles and the number of phases,
  wherein a pole-phase index is an even number, the pole-phase index being a ratio of the predetermined number of stator poles to the number of phases;
  providing a stator having the predetermined number of stator poles, wherein each stator pole is a salient stator pole and the predetermined number of stator poles are symmetrically disposed, and wherein the stator has only a single tooth per stator pole;
  rotatably mounting a rotor with respect to the stator, the rotor comprising the plurality of rotor poles corresponding to the number of rotor poles, wherein the plurality of rotor poles are salient poles and the plurality of rotor poles are symmetrically disposed; and
  winding a plurality of coils around the predetermined number of stator poles to form a plurality of phases of the switched reluctance machine, the plurality of coils adapted to carry electric current to generate magnetic flux, and the plurality of phases corresponding to the number of phases.

* * * * *